(12) United States Patent
Tokuse

(10) Patent No.: US 8,208,690 B2
(45) Date of Patent: *Jun. 26, 2012

(54) IMAGE-PROCESSING DEVICE AND IMAGE-PROCESSING METHOD, IMAGE-PICKUP DEVICE, AND COMPUTER PROGRAM

(75) Inventor: Akira Tokuse, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/232,743

(22) Filed: Sep. 14, 2011

(65) Prior Publication Data

US 2012/0002849 A1    Jan. 5, 2012

Related U.S. Application Data

(63) Continuation of application No. 12/021,382, filed on Jan. 29, 2008, now Pat. No. 8,036,430.

(30) Foreign Application Priority Data

Feb. 16, 2007  (JP) ................................. 2007-037165

(51) Int. Cl.
  *G06K 9/00* (2006.01)
(52) U.S. Cl. ....................... 382/112; 382/118; 382/173
(58) Field of Classification Search ................. 382/112
  See application file for complete search history.

(56) References Cited

U.S. PATENT DOCUMENTS

| 6,363,116 | B1 * | 3/2002 | Edwards et al. | 375/240.21 |
|---|---|---|---|---|
| 6,535,636 | B1 * | 3/2003 | Savakis et al. | 382/173 |
| 6,901,411 | B2 * | 5/2005 | Li et al. | 1/1 |
| 6,961,724 | B1 * | 11/2005 | Kindo et al. | 1/1 |
| 7,043,059 | B2 * | 5/2006 | Cheatle et al. | 382/112 |
| 7,130,864 | B2 * | 10/2006 | Lin et al. | 1/1 |
| 7,136,511 | B2 * | 11/2006 | Harrington et al. | 382/112 |
| 7,680,343 | B2 * | 3/2010 | Covell et al. | 382/224 |
| 7,693,304 | B2 * | 4/2010 | Obrador | 382/112 |
| 7,715,596 | B2 * | 5/2010 | Gehlen et al. | 382/118 |
| 8,036,430 | B2 * | 10/2011 | Tokuse | 382/112 |
| 2002/0071614 | A1 * | 6/2002 | Ali et al. | 382/278 |
| 2002/0090134 | A1 * | 7/2002 | Van Zon | 382/181 |
| 2002/0110286 | A1 * | 8/2002 | Cheatle et al. | 382/305 |
| 2003/0012426 | A1 * | 1/2003 | Ali | 382/155 |
| 2003/0059121 | A1 * | 3/2003 | Savakis et al. | 382/239 |
| 2003/0072486 | A1 * | 4/2003 | Loui et al. | 382/175 |

(Continued)

FOREIGN PATENT DOCUMENTS

JP    9-171560    6/1997

(Continued)

*Primary Examiner* — Sath V Perungavoor
(74) *Attorney, Agent, or Firm* — Oblon, Spivak, McClelland, Maier & Neustadt, L.L.P.

(57) ABSTRACT

An image-processing device configured to process image data including at least one face image includes an image-input unit configured to input the image data, a face-detection unit configured to detect the at least one face image from an image frame of the input image data, an importance-determination unit configured to determine importance of each of the at least one detected face image, and a priority-determination unit configured to determine priority of each of the at least one detected face image based on the determined importance. The importance-determination unit determines the importance considering data on the size and position of the detected face image shown in the image frame, and a priority determined by the last time by the priority-determination unit.

9 Claims, 9 Drawing Sheets

U.S. PATENT DOCUMENTS

| | | | |
|---|---|---|---|
| 2003/0084065 A1* | 5/2003 | Lin et al. | 707/104.1 |
| 2003/0093437 A1* | 5/2003 | Gargi et al. | 707/104.1 |
| 2003/0095197 A1* | 5/2003 | Wheeler et al. | 348/241 |
| 2003/0151674 A1* | 8/2003 | Lin | 348/222.1 |
| 2005/0095014 A1* | 5/2005 | Matsumae et al. | 399/9 |
| 2005/0286802 A1* | 12/2005 | Clark et al. | 382/286 |
| 2006/0257050 A1* | 11/2006 | Obrador | 382/286 |
| 2008/0013787 A1* | 1/2008 | Kobayashi | 382/103 |
| 2008/0062322 A1* | 3/2008 | Dey et al. | 348/589 |
| 2008/0199056 A1* | 8/2008 | Tokuse | 382/118 |
| 2008/0317285 A1* | 12/2008 | Abe | 382/103 |
| 2012/0002849 A1* | 1/2012 | Tokuse | 382/118 |

FOREIGN PATENT DOCUMENTS

| | | |
|---|---|---|
| JP | 3164692 | 3/2001 |
| JP | 2002-333652 | 11/2002 |
| JP | 2003-92700 | 3/2003 |
| JP | 2003-271933 | 9/2003 |
| JP | 2005-86271 | 3/2005 |
| JP | 2005-128156 | 5/2005 |
| JP | 2005-318554 | 11/2005 |
| JP | 2006-33437 | 2/2006 |
| JP | 2006-145629 | 6/2006 |

* cited by examiner

IMAGE-PROCESSING DEVICE AND IMAGE-PROCESSING METHOD, IMAGE-PICKUP DEVICE, AND COMPUTER PROGRAM

CROSS REFERENCES TO RELATED APPLICATIONS

The present application is a continuation application of and claims the benefit of priority under 35 U.S.C. §120 from U.S. application Ser. No. 12/021,382, filed Jan. 29, 2008, which is based upon and claims the benefit of priority under 35 U.S.C. §119 from prior Japanese Patent Application No. JP 2007-037165, filed in the Japanese Patent Office on Feb. 16, 2007, the entire contents of each of which is incorporated herein by reference.

BACKGROUND OF THE INVENTION

1. Field of the Invention

The present invention relates to an image-processing device and an image-processing method, an image-pickup device, and a computer program that are provided to process image data including data on the image of a subject such as a person, and particularly relates to an image-processing device and an image-processing method, an image-pickup device, and a computer program that are provided to detect the subject-image data included in the image data and perform image processing appropriate for the subject-image data.

More specifically, the present invention relates to an image-processing device and an image-processing method, an image-pickup device, and a computer program that are provided to process image data including data on at least two subject images, and particularly relates to an image-processing device and an image-processing method that are provided to determine the importance of the subject images on which data is included in the image data, an image-pickup device configured to perform imaging processing based on the importance-determination result, and a computer program.

2. Description of the Related Art

Cameras have had a long history, as devices for recording visual data. Recently, digital cameras configured to digitize an image captured by a solid-state-image sensor including a charge-coupled device (CCD), a complementary metal-oxide semiconductor (CMOS), etc., are widely available in place of silver-halide cameras configured to make an exposure by using a film and/or a photosensitive plate. The digital camera can store data on a digitally-encoded image in a memory, and perform image processing and/or an image management by using a computer. Furthermore, the digital camera is free of a trouble occurring due to the film life.

The basic camera works of the silver-halide camera are the same as those of the digital camera. That is to say, first, a photographer brings a subject into focus, adjusts the aperture of the camera, that is, the exposure amount, performs framing, so as to form an appropriate composition including the subject image, and presses down the shutter of the camera. For reducing hand-shake, the photographer grasps the main body of the camera and/or installs the camera on a tripod.

As automation technologies relating to the above-described camera works have progressed, the possibility of failing to make an exposure has become significantly low even though the user of a camera is inexperienced in camera operations. For example, the auto-focus (AF) function, the auto-exposure (AE) function, the hand-shake-correction function, the auto-shutter function, etc. have been achieved. In the case where the digital camera is used, AF processing and/or AE processing can be performed not only by using an optical system, but also by performing digital processing. Further, image-quality adjustment is performed for data on a photographed image through digital processing, such as applying a white-balance gain to data on a picked-up image through auto-white-balance (AWB) processing, so that an appropriate color status can be reproduced.

The auto-focus function, the image-quality-correction function, etc. should be used for any of at least one subject image shown in an image frame. In former times, the user of the camera manually determines an important subject. Recently, imaging technologies achieved by using face-detection technologies have been introduced. According to the face-detection technologies, a face image is detected from a picked-up image, and the face image is automatically brought into focus and/or image-quality correction is automatically performed for the detected face image, for example.

Here, a method of using data on an average face image, as template data, comparing the template data to an input-image signal, so as to determine whether or not the template data matches with the input image signal, is widely known in the art, as a method of detecting face-image data from the signal of a picked-up image (e.g., see Japanese Unexamined Patent Application Publication No. 2003-271933 (Paragraphs 0051 to 0053 and FIG. 6)). Further, when a picked-up face image is inclined, it is difficult to correctly detect the face image. In that case, therefore, the angle to which the face image is shown is detected, the face image is rotated according to the detected value, and matching processing or the like is performed. According to a method of detecting the angle to which the face image is shown, a center line of the face image is detected, and a degree indicating the probability that the detected center line corresponds to the true center line of the face is calculated based on the right-to-left symmetry of the face. If the calculated degree of the detected center line is high, the angle of the detected center line is determined to be the angle to which the face image is shown, and data on the angle is output (e.g., see Japanese Unexamined Patent Application Publication No. 9-171560 (Paragraphs 0032 to 0044 and FIG. 4)).

Further, a digital-camera-image-pickup device configured to press down a release button configured to photograph a subject in response to detection of a face image from within an image signal obtained via an optical system has been proposed, as an image-pickup technology achieved by using the face detection (e.g., see Japanese Unexamined Patent Application Publication No. 2003-92700).

Further, an electronic camera configured to detect the image of the face part of a subject from within a picked-up image and perform image processing for a detected face image, so as to reduce the red-eye phenomenon, has been proposed (e.g., see Japanese Unexamined Patent Application Publication No. 2005-86271).

As the accuracy of the face detection increases, the camera-work-automation technologies and/or the image-processing technologies achieved by using the face detection become more convenient and effective for the user. Namely, if the function of determining whether or not a detected face image is important for a photographer is provided, it becomes possible to perform focusing and/or image-quality correction for a necessary face image with stability.

For example, an image-pickup device resistant to the movement of a person and/or hand-shake has been proposed (e.g., see Japanese Unexamined Patent Application Publication No. 2005-318554). In the image-pickup device, image data is stored in memory space A, as data compressed under the RAW-compression system, video data generated by subjecting the image data to γ correction, interpolation, matrix conversion, etc. is stored in memory space B, and a face area is detected within a short time period based on image data stored in the memory space B with a capacity smaller than that of the memory space A.

Further, an electronic still camera configured to put the eyes of a subject into focus so that the entire face of the subject is brought into focus, and determine the subject depth so that two ranges of 10 cm, where the two ranges are separated by the focal distance, are roughly brought into focus has been proposed (e.g., see Japanese Patent No. 3164692).

In actuality, however, the detected face image is not necessarily the subject of the focusing and/or the image-quality correction. Therefore, the focusing and/or the image-quality correction may be performed for a detected face image which is not the subject of the above-described processing. Particularly, when the images of at least two subjects are produced in a picked-up image, it is difficult to determine who should be put into focus (that is to say, which subject should be determined to be the main part).

By intuition, it can be estimated that the importance of a subject image shown near the center of a picked-up image and/or a large subject image shown in the picked-up image is high, and the subject image is the main part. Therefore, after specifying the subject image shown in the picked-up image through the face-detection processing or the like, a priority is given to the subject image based on the distance from the center of the picked-up image to the subject image and/or the size of the subject range. Subsequently, the main-part determination can be made.

For example, a face-importance-determination device configured to determine the importance of a subject for a photographer with precision by acquiring the face-size information and the face-position information detected from an image signal, calculating the first importance factor based on the size information, calculating the second importance factor based on the position information, and calculating the definitive importance based on the first and second importance factors has been proposed (e.g., see Japanese Patent Application No. 2006-20137, where the right thereof had already been transferred to the applicant).

Further, an image-pickup device configured to store information about the feature of an object in advance, detect face images from image data, detect a detected-face image matching with predetermined feature data, and put the detected face image into focus has been proposed (e.g., see Japanese Unexamined Patent Application Publication No. 2002-333652). The above-described image-pickup device stores information about the object features and information about priorities assigned to the object features. If data on a plurality of persons is included in image data, the above-described image-pickup device makes matching determination in decreasing order of the object-feature priority.

Further, a focus-adjustment device configured to detect data on the eyes of a person whose data is included in image data, set a focus frame based on the position and/or size of each of the detected eyes, detect the focal-point position for each of the focus frames, and determine the nearest focal-point position of the focal-point positions to be the definitive focal-point position has been proposed (e.g., see Japanese Unexamined Patent Application Publication No. 2005-128156). In that case, the main-subject determination is made according to whether or not the detected focal-point position is the nearest focal-point position.

Further, a digital camera configured to easily perform face-image detection has been proposed (e.g., see Japanese Unexamined Patent Application Publication No. 2006-33437). When performing the face-image detection by using a through image, the digital camera increases the brightness of the through image so that the brightness of the through image becomes higher than that of the through image shown when the face-image detection is not performed so that the face-image detection can be easily performed. In the above-described digital camera, the frame of the largest face image and/or the nearest face image is determined to be an AF area when the images of at least two faces are detected.

Further, an image-pickup device configured to adjust the focal point of a photographic lens so that a face image shown at the shortest distance from the image-pickup device of all of detected face images is brought into focus, produce the image of a frame surrounding the face image brought into focus on a liquid-crystal display, and move the frame image to another face image through the user operation performed by using a cross key or the like when the face image surrounded by the frame image does not show the face of a desired person has been proposed (e.g., see Japanese Unexamined Patent Application Publication No. 2006-145629). Basically, in the image-pickup device, the main-subject determination is made according to whether or not a detected face image is closer to the image-pickup device than the other detected face images are.

However, when photographing a person and/or an animal such as a pet, the position and/or size of the above-described subject images shown in a picked-up image is not fixed, but changed every moment. That is to say, in a through image and/or video, the result of determination of a subject image which is the main part is changed with frequency so that the auto-focus operation and/or the image-quality-correction operation becomes unstable in the time direction.

SUMMARY OF THE INVENTION

The present invention has been achieved, so as to provide an image-processing device and an image-processing method, an image-pickup device, and a computer program that can detect a subject image on which data is included in image data and perform image processing appropriate for the detected subject image.

The present invention further provides an image-processing device and an image-processing method, an image-pickup device, and a computer program that can correctly determine the importance of each of subject images on which data is included in image data and perform image processing appropriate for a subject image with high importance.

The present invention further provides an image-processing device and an image-processing method, an image-pickup device, and a computer program that can stabilize the detection of a subject image with high importance from image data including data on subject images, where the position and size of each of the subject images is changed with time, and perform image processing appropriate for the subject image with the high importance.

Accordingly, an image-processing device according to an embodiment of the present invention, which is configured to process image data including at least one face image, includes an image-input unit configured to input the image data, a face-detection unit configured to detect the at least one face image from an image frame of the input image data, an importance-determination unit configured to determine importance of each of the at least one detected face image, and a priority-determination unit configured to determine priority of each of the at least one detected face image based on the determined importance, wherein the importance-determination unit determines the importance considering data on the size and the position of the detected face image shown in the image frame, and a priority determined by the last time by the priority-determination unit.

Recently, automation technologies relating to the above-described camera works have progressed, where the automation technologies include the AF function, the AE function, the hand-shake-correction function, the auto-shutter function, and so forth. In the case where a digital camera is used, AF processing and/or AE processing can be performed not only by using an optical system, but also by performing digital processing. Further, image-quality adjustment is performed for data on a photographed image through digital processing, such as applying a white-balance gain to data on a picked-up image, so that an appropriate color status can be reproduced.

Since the auto-focus function, the image-quality-correction function, etc. should be used for any of at least one subject image shown in an image frame, the technology of performing the AE processing, the AF processing, and the image-quality-correction processing for a detected face image shown in an image by using the face-detection technology has been introduced. Here, when the images of at least two subjects are shown in a picked-up image, it should be appropriately determined who should be brought into focus (that is to say, which subject should be determined to be the main part).

By intuition, it can be estimated that the importance of a subject image shown near the center of a picked-up image and/or a large subject image shown in the picked-up image is high, and the subject image is the main part. However, when the face image is detected from video such as a through image, the position and/or size of the subject image is not fixed, but changed every moment. Therefore, the main-subject image frequently changes, which makes the auto-focus operation and/or the image-quality-correction operation unstable in the time direction.

Therefore, a method according to an embodiment of the present invention is used, where the method includes the step of referring to the result of priority determination made in the previous image frame at the time where the importance determination and/or priority assignment is performed for each of subject images detected from video frames including through images by performing the face-image detection. According to the above-described method, the result of the priority determination is stabilized in the time direction, even though the position and/or size of each of the subject images produced in the image frame changes every moment. As a result, when performing control such as auto focusing for a subject detected during monitoring, a subject image with high priority, that is, the main-subject image is prevented from being changed with a high frequency. Subsequently, stable control can be achieved.

Further, according to an embodiment of the present invention, a determination method is introduced, so as to suppress the importance of a subject image moving around with speed in the screen image, whereby the result of the priority determination is stabilized in the time direction.

According to an embodiment of the present invention, the importance Wf is calculated according to the following equality for each of at least one detected face image included in video, and the priority of each of the at least one detected face image is determined based on the importance. Then, when performing the camera control including the AF processing, the AE processing, etc. and/or the image adjustment such as the AWB processing in a digital camera or the like, the above-described processing is performed according to a detected face image with a high priority.

Wf=(size coefficient)×(size of detected-face image produced in screen image)

−(coefficient x)×(distance x from screen-image center to detected-face image)

−(coefficient y)×(distance y from screen-image center to detected-face image)

−(coefficient v)×(average speed with which detected-face image moves in screen image)

+(preferential constant [previous order])

If the value of the size coefficient is high in the above-described importance-calculation equality, as the size of a subject image produced in the picked-up image increases, the subject image is more easily determined to be the main-subject image. Further, when the value of each of the coefficients x and y is high, the subject image is more easily determined to be the main-subject image, as the subject image gets nearer the center of the picked-up image in each of horizontal and vertical directions.

Further, in the importance-calculation equality, the factor (coefficient v)×(average speed) relating to the average speed of the detected-face image shown in the screen image is subtracted from the importance Wf so that the priority of the detected-face image in large motion is suppressed. Further, when the value of the coefficient v is increased, the lower the speed of the detected-face image becomes, more easily the detected-face image is determined to be the main-subject-image.

Here, the basic magnitude relations between the coefficients used in the right side of the above-described importance-calculation equality can be expressed, as below, for example.

coefficient v>size coefficient>coefficient x>coefficient y

According to the above-described magnitude relations, the priority of the subject image moving with speed in the screen image can be decreased. Further, of subject images stationary over a plurality of image frames, a priority is assigned to a large-sized subject image close to the center of the image frame in the horizontal direction. However, the substance of an embodiment of the present invention is not necessarily limited to the magnitude relationships between the coefficients shown in the above-described equality. Namely, the magnitude relationships between the importance coefficients may be dynamically changed according to photographing mode and/or operation mode set to a camera, such as portrait-photographing mode, background-photographing mode, sport-photographing mode, etc., the photographing environment and/or operation environment of the camera, such as night scenery, darkness, and so forth.

Further, in the fifth term of the right side of the above-described importance-calculation equality, a preferential constant is added to the importance Wf. The above-described preferential constant is a weight constant determined according to the previous priority. As the previous priority of the detected-face image becomes higher, the value of a preferential constant given to the detected-face image is increased so that the priority change occurring at every control cycle is reduced. Subsequently, the auto-focus operations and/or the image-quality-correction operations are stabilized in the time direction. Although each of the size of the detected-face image, the distance between the detected-face image and the screen-image center, etc. is changed by as much as 10% of what it was, it is preferable that the preferential constant is set to a value which does not change the priority of a subject image to which the highest importance Wf was assigned last time.

However, if subject images are aligned in sequence from the front, as is the case with a group photograph, it is estimated that a subject of which image is shown in the lower part of the screen image is closer to the camera than other subjects are. Therefore, the importance-calculation equality may be changed, as below, so that the priority of the subject image becomes higher, as the position of the subject image is lowered.

$Wf$=(size coefficient)×(size of detected-face image produced in screen image)

−(coefficient x)×(distance x from screen-image center to detected-face image)

−(coefficient y)×(distance y from lower end of screen image to detected-face image)

−(coefficient v)×(average speed with which detected-face image moves in screen image)

+(preferential constant [previous order])

Further, according to a composition generated in consideration of the background image, a plurality of subject images is aligned at a distance from the screen-image center. Therefore, the importance Wf may be calculated based on the "distance x from the barycenter of each of subject images" in place of the "distance x from the screen-image center to the detected-face image", as shown in the following equality.

$Wf$=(size coefficient)×(size of detected-face image produced in screen image)

−(coefficient x)×(distance x from barycenter of each of subject images to detected-face image)

−(coefficient y)×(distance y from screen-image center to detected-face image)

−(coefficient v)×(average speed with which detected-face image moves in screen image)

+(preferential constant [previous order])

Further, the importance may be calculated by using not only the detected-face-image information but also the face-recognition-result information. The following equality shows an example method of calculating the importance Wf of the detected-face image through the further use of the face-recognition-result information.

$Wf$=(size coefficient)×(size of detected-face image produced in screen image)

−(coefficient x)×(distance x from screen-image center to detected-face image)

−(coefficient y)×(distance y from screen-image center to detected-face image)

−(coefficient v)×(average speed with which detected-face image moves in screen image)

+(preferential constant [previous order])

+(recognition constant)

According to the above-described importance-calculation equation, when the detected-face image is the image of a face on which data had already been registered with the face-recognition unit, the detected-face image is more easily determined to be the main-subject image.

Thus, an image-processing device according to an embodiment can determine the main subject image with stability from video showing the plurality of subject images. Then, when the above-described technologies are used for an image-pickup device such as a digital camera, it becomes possible to control the camera works including the AF processing, the AE processing, etc. and/or perform the image-quality adjustment including the AWB processing, sharpness-and-saturation-contrast adjustment, flash-light control, the red-eye reduction, etc. according to the main-subject image.

Further, a computer program according to another embodiment of the present invention, which is written in a computer-readable format, so as to process image data including at least one face image on a computer, makes the computer execute the steps of inputting the image data, detecting the at least one face image from an image frame of the input image data, determining the importance of each of the at least one detected face image, and determining the priority of each of the at least one detected face image based on the determined importance, wherein, at the importance-determining step, the computer is made to determine the importance considering data on the size and position of the detected face image shown in the image frame, and a priority determined by the last time, at the priority-determination step.

The computer program according to the above-described embodiment defines a computer program written in a computer-readable format, so as to achieve predetermined processing on a computer. That is to say, by installing the computer program according to the above-described embodiment onto a computer, a combined effect is produced on the computer so that the same effect as that of the image-processing device according to the above-described embodiment can be obtained.

The present invention can further provide an image-processing device and an image-processing method, an image-pickup device, and a computer program that can determine the importance of each of subject images on which data is included in image data and perform image processing appropriate for a subject image with a high priority.

The present invention can further provide an image-processing device and an image-processing method, an image-pickup device, and a computer program that can stabilize the detection of a subject image with high importance from image data including data on subject images, where the position and size of each of the subject images is changed with time, and perform image processing appropriate for the subject image with the high priority.

According to an embodiment of the present invention, when the importance determination and/or the priority assignment is performed for each of subject images detected from a video frame including a through image by performing the face-image detection, the result of the priority determination is stabilized in the time direction by referring to the result of priority determination made in the previous image frame, even though the position and/or size of each of the subject images produced in the image frame changes every moment. As a result, when performing control such as auto focusing for a subject detected during monitoring, a subject image with a high priority, that is, the main-subject image is prevented from being changed with a high frequency. Subsequently, it becomes possible to perform control with stability.

Further features and/or advantages of the present invention will become apparent from the following description of exemplary embodiments with reference to the attached drawings.

DESCRIPTION OF THE PREFERRED EMBODIMENTS

Hereinafter, embodiments of the present invention will be described in detail with reference to the attached drawings.

Figure 1:
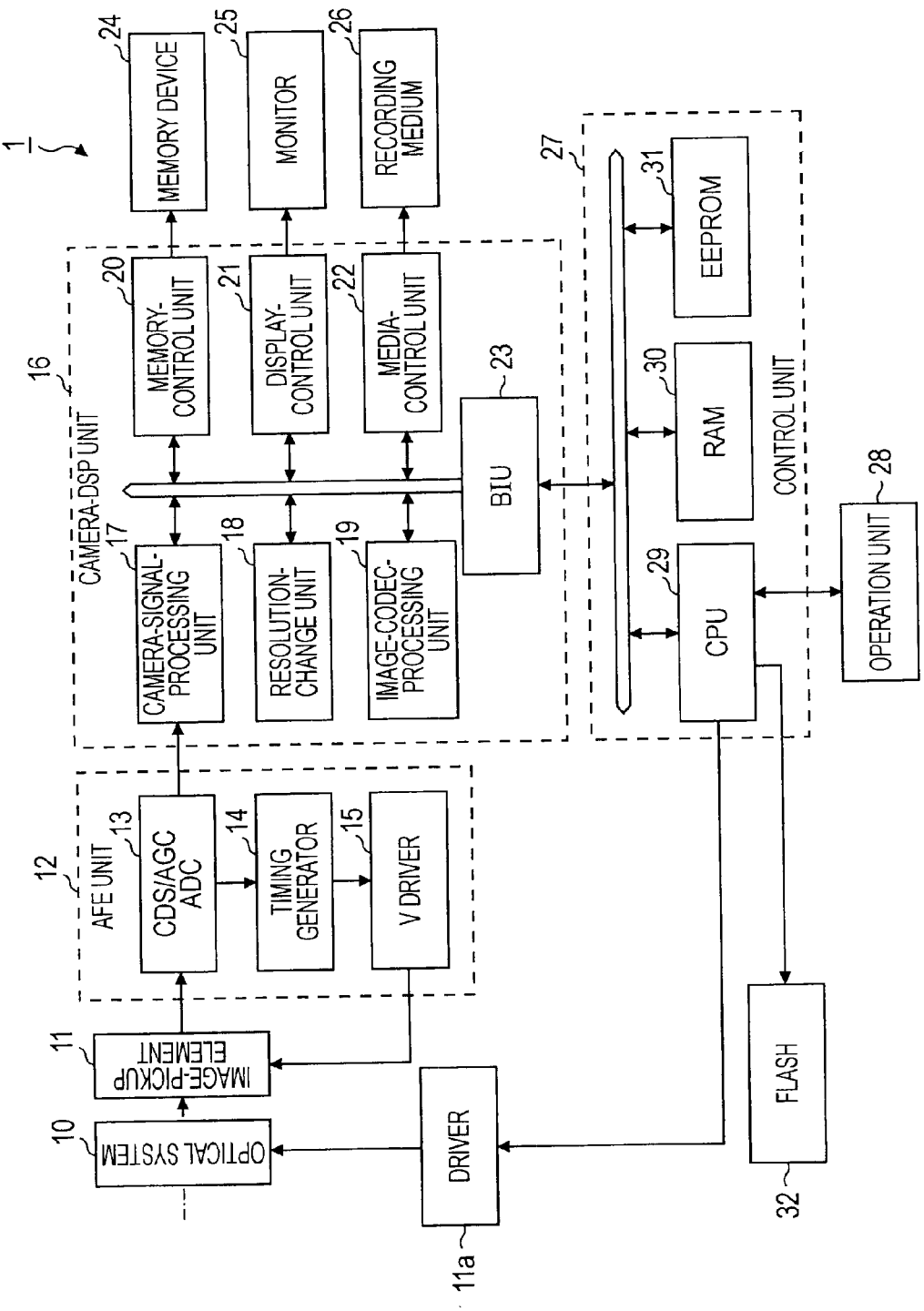
FIG. 1 shows the configuration of a digital-still camera according to an embodiment of the present invention.

FIG. 1 shows the configuration of a digital-still camera according to an embodiment of the present invention.

The digital-still camera shown in FIG. 1 includes an image-pickup element 11, a preprocessing unit 12, and a camera-digital-signal-processing (DSP) unit 16.

An optical system 10 includes a lens used to condense light from a subject on the image-pickup element 11, a drive mechanism configured to move the lens, so as to perform focusing and/or zooming, a shutter mechanism which is opened and/or closed, so as to make the light from the subject incident upon the image-pickup element 11 over a predetermined time period, and an iris (aperture) mechanism limiting the direction and range of a pencil of rays from the subject. None of the above-described condenser lens, drive mechanism, shutter mechanism, and iris mechanism is shown. A driver 10a controls each of the mechanisms driven in the optical system 10 according to a control signal transmitted from a central-processing unit (CPU) 29 which will be described later.

In the image-pickup element 11, pixels having the photo-electric-conversion effect are two-dimensionally arranged, where the pixels includes charge-coupled devices (CCDs), complementary-metal-oxide semiconductors (CMOSs), etc., so that the incident light from the subject is converted into an electrical signal. A G-checkered-and-RB-color-coding-single board or the like is provided on the light-reception side of the image-pickup element 11. The signal charges corresponding to the amount of light made incident through color filters are accumulated on each of the pixels. Further, the signal charges of three colors are read from each of the pixels, and the color of the incident light at the position of the pixel can be reproduced based on the amount of the signal charges of three colors. Further, an analog-image signal output from the image-pickup element 11 is a primary-color signal, where the primary color includes red, green, and blue. However, the analog-image signal may be a complementary-color signal.

An analog-front-end (AFE) unit 12 includes a correlated double sampling (CDS)/automatic gain control (AGC)/analog-to-digital-conversion (ADC) block 13, a timing generator 14, and a V driver 15. The AFE unit 12 is provided, as a single integrated-circuit (IC) chip, for example.

In the CDS/AGC/ADC block 13, the low noise of a signal transmitted from the image-pickup element 211 is suppressed with high precision (correlated double sampling), where the signal is included in a pixel signal. After that, sample holding is performed, and the signal is subjected to appropriate gain control through an AGC circuit, and AD conversion, so that a digital-image signal is output.

The timing generator 14 generates a timing-pulse signal used to drive the image-pickup element 11. Then, the V driver 15 outputs a drive signal used to output electrical charges of the pixels of the image-pickup element 11 in a vertical direction and in lines according to the timing-pulse signal.

The camera-DSP-unit 16 includes a camera-signal-processing unit 17, a resolution-change unit 18, an image-codec-processing unit 19, a memory-control unit 20, a display-control unit 21, and a media-control unit 22. The camera-DSP-unit 16 is configured, as a single IC chip, for example.

The camera-signal-processing unit 17 performs preprocessing including defective-pixel correction, digital-clamp processing, digital-gain control, etc. for an image signal transmitted from the AFE unit 12. After that, a white-balance gain is applied to the image signal through auto-white-balance (AWB) processing, and the image signal is subjected to image-quality-correction processing including sharpness-and-saturation-contrast adjustment or the like so that an appropriate color state is reproduced. Then, the image signal is subjected to demosaicing so that an RGB-image signal is generated (the image-quality adjustment may include flash-light control, red-eye reduction, etc.). Further, the camera-signal-processing unit 17 performs γ correction for the RGB-image signal, so that the RGB-image signal is changed into a gray scale appropriate for outputting image information to a monitor, printing the image information out, and recording the image information. Further, the camera-signal-processing unit 17 detects brightness information based on an image signal output from the AFE unit 13, and performs histogram detection, so as to calculate the histogram of each of specified ranges, and color detection, so as to detect color information for each of the specified ranges. Information about the results of the histogram detection and the color detection is output to a control unit 27 which will be described later.

The resolution-change unit 18 changes the size of an image. The image-codec-processing unit 19 performs color-space conversion for the RGB-image signal so that the RGB-image signal is converted to a brightness signal and a color-difference signal (Y/Cr/Cb), and performs encoding such as Joint Photographic Experts Group (JPEG) compression.

The memory-control unit 20 controls access operations, so as to write and/or read data such as information about a photographed image into and/or from a memory device 24 including a synchronous dynamic random access memory (SDRAM) or the like.

A monitor display 25 includes a liquid-crystal display (LCD), for example. The display-control unit 21 controls driving of the monitor display 25, converts image data output from the camera-signal-processing unit 17 and/or image data held in the memory device 24 into a signal used to produce an image on the monitor display 25, and outputs the signal to the monitor display 25. Further, in response to a request transmitted from the control unit 27 which will be described later, the display-control unit 21 synthesizes data on a menu screen image, data on various types of setting screen images, various types of alarm information, etc. Then, the display-control unit 21 outputs the data and the information so that on-screen-display (OSD) output is achieved.

The media-control unit 22 is provided with a slot in which a removable recording medium such as "MEMORY STICK (Registered Trademark)" is inserted so that data is written and/or read into and/or from the recording medium 26. For example, the media-control unit 22 stores photographed-image-file data retained in the memory device 24 in the recording medium 26.

Further, the camera-DSP unit 16 is connected to the control unit 27 via a bus-interface unit (BIU) 23. The control unit 27 includes an operation unit 28 used by a user, so as to operate a shutter button, perform zoom operation, and specify other camera works. The control unit 27 further includes a central-processing unit (CPU) 29 which exercises centralized control over operations of the entire device according to the user operation, a RAM 30 provided, as the main-storage memory of the CPU 29, and an electrically-erasable-and-programmable-read-only memory (EEPROM) 31 configured to retain program code, device information, etc. in a nonvolatile manner.

For example, the operation unit 28 includes a shutter-release button, keys and/or a dial provided to make various settings such as turning on/off the flash-light emission, and so forth. The control signals corresponding to the above-described user operations are transmitted to the CPU 29.

A flash-light-emission unit 32 emits flash light according to flash-control information transmitted from the control unit 27.

In the digital-still camera 1, light is received and subjected to photoelectric conversion by the image-pickup element 11 so that signals are obtained. The signals are transmitted to the AFE unit 12 in sequence, subjected to the CDS processing and/or the AFE processing, and changed into digital-image signals. The camera-signal-processing unit 17 performs image-quality correction for the digital-image signals transmitted from the AFE unit 12. Eventually, the digital-image signals are changed into a brightness signal (Y) and color-difference signals (R-Y and B-Y) and output.

Image data output from the camera-signal-processing unit 17 is converted into the signal of an image for display by the display-control unit 21 and a through image is produced on the monitor display 25. Further, when the user instructs the control unit 27 to store image data by operating the operation unit 28, for example, the image data output from the camera-signal-processing unit 17 is transmitted to the image-codec-processing unit 19, subjected to predetermined compression-and-encoding processing, and stored in the memory device 24 via the memory-control unit 20 and/or stored in the recording medium 26 via the media-control unit 22. When storing data on a still image, the image data corresponding to a single frame is transmitted from the camera-signal-processing unit 17 to the image-codec-processing unit 19. When storing data on video, processed image-data items are successively transmitted to the image-codec-processing unit 19.

According to the above-described embodiment, the camera-signal processing including auto-focus (AF) processing, auto-exposure (AE) processing, etc. and/or signal-correction processing such as image-quality correction is performed based on the result of face recognition. Therefore, in the control unit 27, the CPU 29 executes a predetermined control program so that the above-described camera-signal processing is performed. Subsequently, face-recognition processing is performed for data on the image of a face which is a subject based on an image signal obtained through the above-described camera-signal processing. Here, if the image data includes data on at least two face images, the importance of each of the face images is determined and/or priorities are assigned to the face images. Then, the control unit 27 transmits a control signal to a driver 11a, so as to perform the AF processing and/or the AE processing for a subject-image with the highest priority. Otherwise, the control unit 27 transmits a control signal to the camera-signal-processing unit 17 provided in the camera-DSP unit 13, so as to perform the camera-signal processing including the AF processing, the AE processing, etc., and/or the image-quality-correction processing such the AWB processing for the subject image with the highest priority.

According to the face-recognition system, image-recognition processing is performed, and it is determined whether or not the person corresponding to the face-image data had been registered. That is to say, two processing procedures including a face-detection procedure and a face-recognition procedure are performed. According to the face-detection procedure, face-image data is detected from image data and face-area data is extracted from the face-image data. Data on a person's face is detected from data on a single image (a single photograph, a single picture (a single field and/or a single frame)) of video, and data on the position and size of the person's face is output. According to the face-recognition procedure, it is determined whether or not detected data on a single face agrees with face data that had already been registered.

Figure 2:
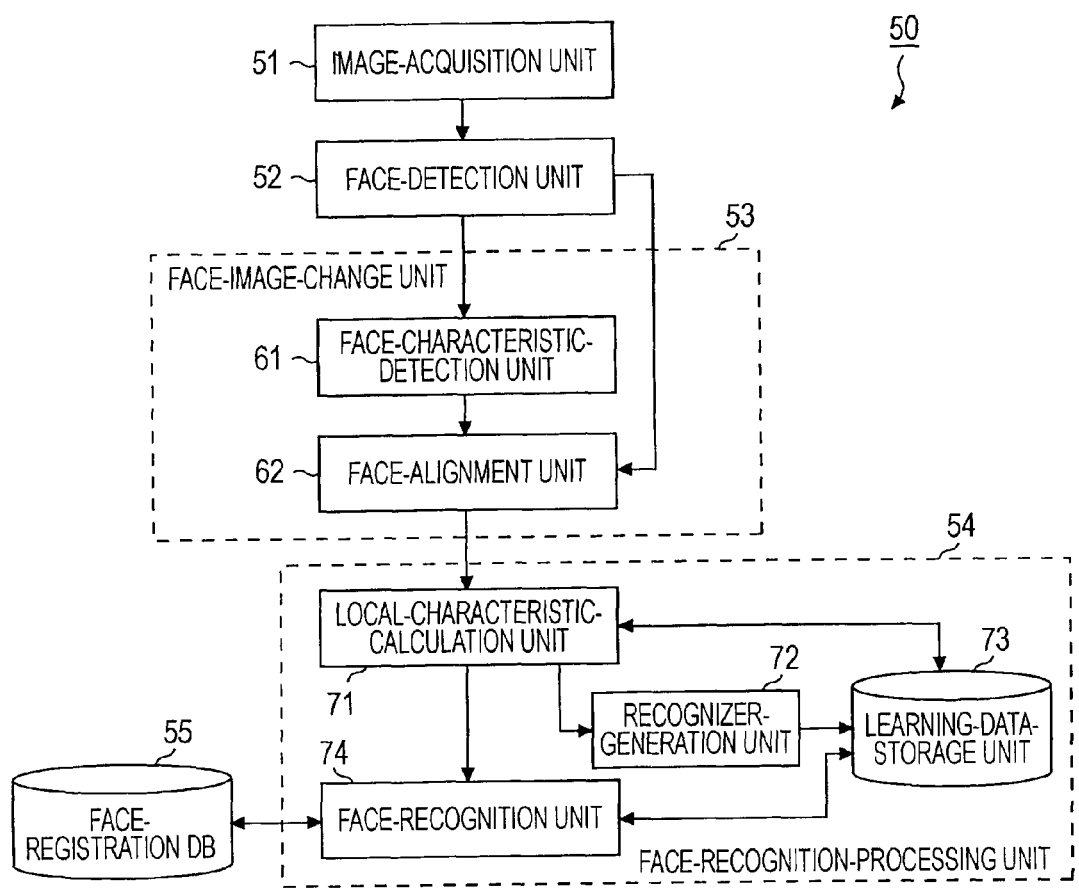
FIG. 2 shows an example configuration of a face-recognition system.

FIG. 2 shows an example configuration of a face-recognition system 50 including an image-acquisition unit 51, a face-detection unit 52, a face-image-change unit 53, a face-recognition-processing unit 54, a face-registration database 55, and a recognition-result-output unit 56. The face-recognition system 52 operates in two modes including learning mode and recognition mode. In the learning mode, the face-recognition system 50 learns recognition processing by using image data for learning, and generates a recognizer used to perform recognition processing in the recognition mode. Further, in the recognition mode, the face-recognition system 50 recognizes image data by using the recognizer generated in the learning mode, and determines whether or not the image data for recognition includes data on the face of a person who had already been registered.

When the face-recognition system 50 is mounted on the digital-still camera 1 shown in FIG. 1, the image-acquisition unit 51 acquires data on photographed images from the camera-signal-processing unit 17. The acquired image data includes at least data on the face part of a person. In the learning mode, data on a plurality of images-for-learning of a predetermined person is acquired from the photographed-image data. The plurality of images-for-learning shows face images of different sizes and the face images viewed from different directions. Further, in the learning mode, data on a plurality of images which do not show any image of the person's face is acquired. Further, in the recognition mode, data on a picked-up image showing the face of a person for recognition is acquired. The image data acquired by the image-acquisition unit 51 is transmitted to the face-detection unit 52.

The face-detection unit 52 extracts data on the person's face (the position and size of the face) by analyzing the image data transmitted from the image-acquisition unit 51, and detects the image of the extracted face data, that is, a "face image". The image data transmitted from the image-acquisition unit 51 includes data on the face of a person and/or an animal such as a pet for recognition. However, the image data may include not only the face-image data but also data on an image of the whole body of the person and/or the animal for recognition. The face-detection unit 52 determines the area of the person's face, and extracts data on the image corresponding to the face area. The face-image data detected by the face-detection unit 52 is transmitted to a face-characteristic-detection unit 61 and a face-alignment unit 62 that are provided in the face-image-change unit 53.

As described above, the face-image-change unit 53 includes the face-characteristic-detection unit 61 and the face-alignment unit 62.

The face-characteristic-detection unit 61 detects data on characteristics for alignment from the face-image data transmitted from the face-detection unit 52, where the characteristic-for-alignment data is used for morphing processing performed by the face-alignment unit 62. The characteristic-for-alignment data includes data on the characteristic parts of the person's face, such as the eyes, nose, mouth, etc., that is, face-characteristic parts. Further, the characteristic-for-alignment data may further include data obtained by dividing the face-image data into small parts so that the characteristics of the face can be detected. For example, the position of a characteristic of the face can be detected by using an active-appearance-models (AAM) method or the like.

The face-alignment unit 62 determines in which direction the face image of the detected data is oriented by analyzing the face-image data transmitted from the face-detection unit 52 and the characteristic-for-alignment data transmitted from the face-characteristic-detection unit 61, and performs morphing processing including affine transformation so that the face-characteristic position agrees with the reference position. For example, when the face image shows a face viewed from the front, the morphing processing is performed in the following manner. Namely, the eyes of the face are shown in a horizontal position with a predetermined distance therebetween, the nose is shown below the point located midway between the eyes, and the mouth is shown below the nose. Although the face-image data transmitted from the face-detection unit 52 does not show the image of a face viewed from the front, the face image is changed to an image approximately equivalent to the image of the face viewed from the front. As a result, even though the face-image data acquired by the image-acquisition unit 51 does not show the image of a face viewed from the front, the face-recognition-processing unit 54 provided in the post stage can identify the face image.

The face-recognition-processing unit 54 includes a local-characteristic-calculation unit 71, a recognizer-generation unit 72, a learning-data-storage unit 73, and a face-recognition unit 74.

After the external characteristic data is adjusted so that the characteristics shown in the face image are shown at the reference positions, the face-image data is transmitted to the local-characteristic-calculation unit 71. The local-characteristic-calculation unit 71 calculates the quantity of local characteristics included in a plurality of characteristic points shown in the face image of the transmitted data. A characteristic point used to obtain the local-characteristic quantity may be the same as the characteristic-point-for-alignment detected by the face-characteristic-detection unit 51. Otherwise, a plurality of points different from the detected characteristic-point-for-alignment may be provided, as the characteristic point used to obtain the local-characteristic quantity.

The local-characteristic-calculation unit 71 includes a plurality of azimuth-selective filters with different frequency components. That is to say, the local-characteristic-calculation unit 71 is provided, as a "Gabor filter" configured to extract data on the quantity of characteristics of a face image. It had already been determined that the photoreceptor of a person includes a cell having the selectivity to a predetermined azimuth. The above-described cell includes a cell which responds to a vertical line and a cell which responds to a horizontal line. Likewise, the Gabor filter is a space filter including a plurality of azimuth-selective filters. The space representation of the Gabor filter is achieved, as below. Namely, a Gaussian function is used, as a window function, and a Gabor function obtained by using a sine function and/or a cosine function, as a basis function, is used, as a frequency response. The size of the filter window is determined and fixed at 24×24. Further, when five types of frequencies f and angles θ in eight directions are given, forty types of Gabor filters are provided.

The operation of the Gabor filter is the convolution of a pixel using the Gabor filter and the coefficient of the Gabor filter. The coefficient of the Gabor filter can be divided into a real part where the frequency response includes a cosine function and an imaginary part where the frequency response includes a sine function. The convolution operation is performed for each of the real part and the imaginary part, and the component of the real part is merged with that of the imaginary part so that a result of the Gabor filtering can be obtained, where the result is a single scalar value. The above-described operation is performed by using the forty types of Gabor filters at maximum while changing the frequency f and the angle θ. Subsequently, a characteristic-quantity vector including the group of forty scalar values at maximum, that is, a "Gabor jet" can be obtained. The Gabor jet is obtained at each of characteristic-quantity-extraction positions detected in the horizontal direction and the vertical direction at predetermined intervals on the face-image data, as the local-characteristic quantity. The Gabor jet is invariant even though the characteristic-quantity-extraction position is displaced and/or deformed to some extent.

In the learning mode, the local-characteristic-calculation unit 71 transmits a plurality of the characteristic-quantity vectors including forty or fewer parameters to the recognizer-generation unit 72 at each of the characteristic points. Further, in the recognition mode, the local-characteristic-calculation unit 71 calculates the local-characteristic quantity corresponding to the characteristic point corresponding to the quantity of characteristic-for-recognition, where the characteristic-for-recognition-quantity data is stored in the learning-data-storage unit 73. Then, the local-characteristic-calculation unit 71 transmits the local-characteristic-quantity data to the face-recognition unit 74. The characteristic-for-recognition-quantity data indicates which local-characteristic quantity of which characteristic point is used by the recognizer generated by the recognizer-generation unit 72 through the learning corresponds. Namely, the characteristic-for-recognition-quantity data shows which part of the Gabor filter is used. Subsequently, the calculation of a correlation coefficient can be performed for each of the characteristic points, where the correlation-coefficient calculation is performed at the time where the recognizer is generated and the time where the face recognition is performed. Further, the above-described correlation-coefficient calculation can be performed not only for a single type of correlation coefficient including a characteristic-quantity vector using every dimension but also for a plurality of correlation coefficients including a characteristic-quantity vector using part of dimensions. That is to say, data on the quantity of a plurality of characteristics of different dimensions can be used for the learning and the recognition.

In the learning mode, the recognizer-generation unit 72 performs statistical-learning processing through adaptive boosting (Adaboost) by using data on the quantity of characteristics of an image-for-learning, where the quantity is calculated by the local-characteristic-calculation unit 71, and data on the quantity of characteristics of a model-for-learning, where data on the model-for-learning is retained in advance. In the recognition mode, the recognizer-generation unit 72 generates the recognizer used for performing the recognition processing, and stores the generated recognizer and the information about the generated recognizer (data on a correlation value and information showing the likelihood of the recognizer) in the learning-data-storage unit 73. Further, while the recognizer is learning data, the recognizer-generation unit 72 extracts data only on the quantity of model characteristics significantly affect recognition of a subject-face image. The recognizer-generation unit 72 transmits and stores the model-characteristic-quantity data in the learning-data-storage unit 73, as the characteristic-for-recognition-quantity data. The characteristic-for-recognition-quantity data indicates which local-characteristic quantity of which characteristic point is used by the recognizer. Namely, the characteristic-for-recognition-quantity data shows which rectangular-region part of the Gabor filter is used by the recognizer.

Here, the term "Adaboost" denotes a theory explaining that a strong classifier can be configured by combining many weak classifiers slightly better than a random classifier, where the weak classifier is often referred to as a weak learner. The above-described theory is proposed by Freund et al. in the year 1996. The recognizer generated by the recognizer-generation unit 72 denotes the above-described weak classifier slightly better than the random classifier. Each of the recognizers is generated so that the recognizer places importance on recognition which is difficult for the previously generated recognizer to perform. Then, during the recognition processing, the confidence is calculated depending on the degree of confidence of each of the weak recognizers. Then, a majority decision is made based on the calculated confidence.

The learning-data-storage unit 73 stores the recognizer generated by the recognizer-generation unit 72, information about the generated recognizer, and the characteristic-for-recognition-quantity data.

In the recognition mode, the face-recognition unit 74 calculates the correlation coefficient between the characteristic quantity calculated by the local-characteristic-calculation unit 71 and registered-face-image data registered with in a face-registration database 55, determines whether or not the registered-face-image data agrees with data on a registered person, and transmits data on the determination result to a recognition-result-output unit 36. That is to say, the face-recognition unit 74 makes a majority decision for the result of determination made by the recognizer based on the confidence of the recognizer stored in the learning-data-storage unit 73, and determines whether or not the registered-face-image data agrees with data on the registered person.

Information about the characteristic quantity required to recognize the registered person is registered with a face-registration database 55. The above-described Gabor jet corresponding to each of the characteristic points of the face image of the registered person may be registered with the face-registration database 55. However, only information about the characteristic quantity corresponding to the characteristic-for-recognition quantity may be registered with the face-registration database 55.

The recognition-result-output unit 56 outputs the determination-result data transmitted from the face-recognition unit 74. For example, when registered-face-image data agreeing with face-image data included in transmitted image data is registered with the face-registration database 55, information about the name or the like of a person related to the registered-face-image data agreeing with the face-image data is read from the face-registration database 55, and the information about the name or the like is output from the recognition-result-output unit 36.

Here, refer to Japanese Patent Application No. 2006-332302 for details on the face-recognition system, where the right of Japanese Patent Application No. 2006-332302 had already been transferred to the applicant.

Recently, automation technologies related to camera works and/or image-quality correction are introduced for digital cameras. The convenience of the above-described automation technologies increases when the automation technologies and face-recognition technologies are used in combination, so as to specify subject-image data included in image data.

Figure 3:
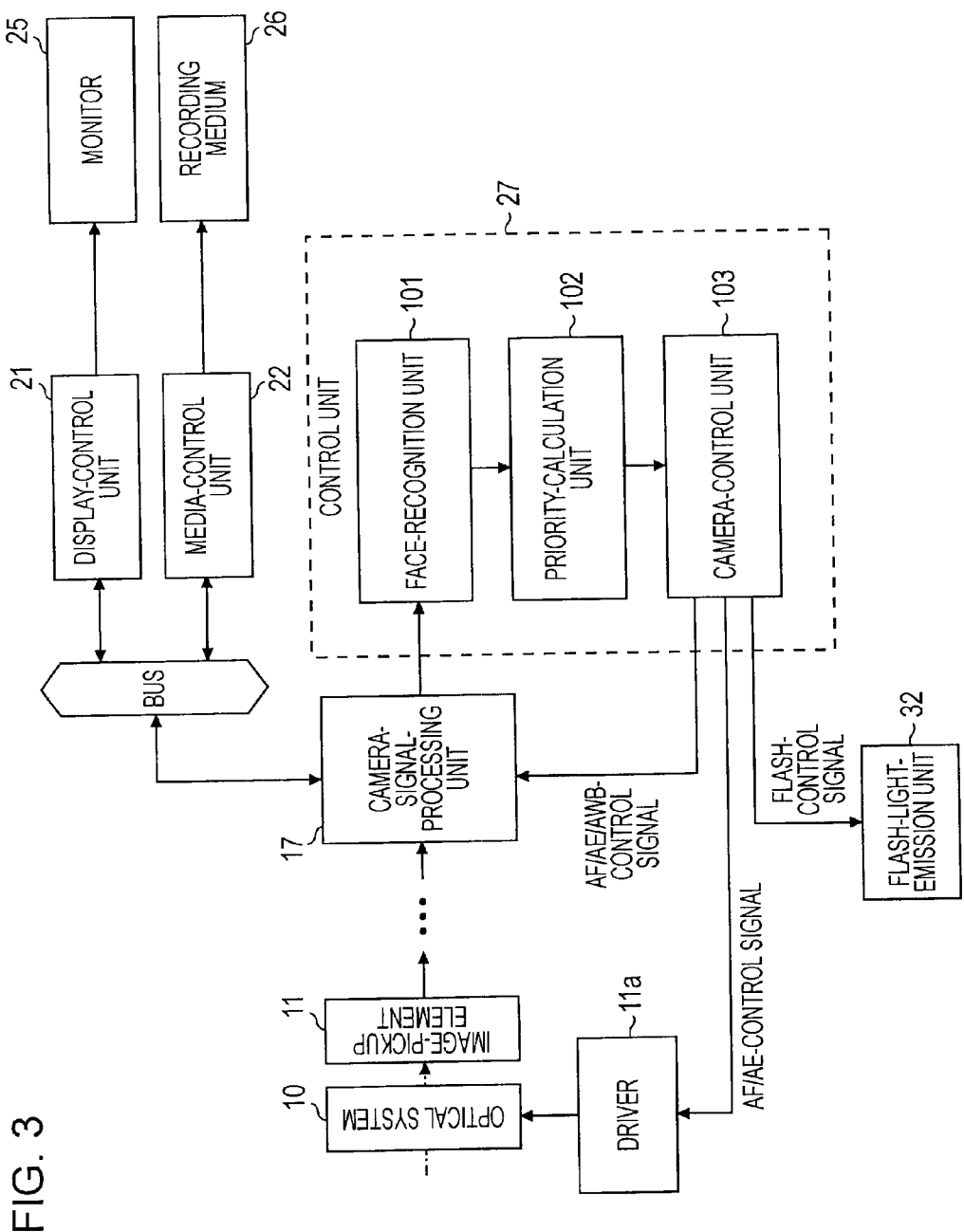
FIG. 3 shows a functional configuration used to perform camera-signal processing including AF processing, AE processing, etc. and/or signal-correction processing including image-quality correction or the like based on the result of face recognition.

FIG. 3 shows an example functional configuration used to perform the camera-signal processing including the AF processing, the AE processing, etc. and the signal-correction processing including the image-quality correction or the like based on the face-recognition result. Functional blocks shown in FIG. 3 include a face-recognition unit 101, a priority-calculation unit 102, and a camera-control unit 103. In actuality, each of the functional modules 101 to 103 is constructed by the control unit 27 executing a predetermined control program. Further, the face-recognition unit 101 includes the face-recognition system shown in FIG. 2.

The camera-signal-processing unit 17 provided in the camera-DSP unit 13 transmits data on a through image to the face-recognition unit 101. Then, the above-described face-detection processing and face-recognition processing are performed, and data on the face-detection result showing the position, size, etc. of each of the detected face images shown in an image frame and that on the face-recognition result showing information of the person corresponding to the detected face image are output to the priority-calculation unit 102 provided in the post stage. Here, the face-detection processing is performed for each of image frames generating the through image and/or at predetermined frame intervals, and items of data on the detected face image are output to the priority-calculation unit 102 in sequence.

The priority-calculation unit 102 calculates the importance (score) Wf for each of the detected face images included in the image frame based on the face-detection result and/or the face-recognition result. Further, the priority-calculation unit 102 assigns priority to each of the detected face images according to each of the score values and transmits data on the priority-assignment result to the camera-control unit 103.

When determining the importance of a plurality of subject images detected from a video frame such as a through image through the face detection, the position and/or the size of the subject image shown in an image frame is changed every moment. Subsequently, the result of the priority determination becomes unstable in the time direction, that is to say, the main part shown in the image frame changes frequently. In the above-described embodiment, therefore, the priority-determination result is stabilized in the time direction by referring to the result of priority determination made in the previous video frame. Details on procedures of the priority calculation will be described later.

Upon receiving data on the priority of each of the detected face images, the data being transmitted from the priority-calculation unit 102, the camera-control unit 103 outputs a control signal, so as to achieve the auto-focus function, the image-quality-correction function, etc. according to the detected face image with high priority. More specifically, the camera-control unit 103 transmits a control signal relating to the AF processing and the AE processing to the driver 11a which drives an optical system 11. Otherwise, the camera-control unit 103 transmits a control signal used to perform the camera-signal processing including the AF processing, the AE processing, etc., and/or the image-quality-adjustment processing such as the AWB processing to the camera-signal-processing unit 17. Otherwise, the camera-control unit 103 transmits a control signal used to control the flash-light-emission time to the flash-light-emission unit 32.

Naturally, as the accuracy of the face detection increases, the camera-work-automation technologies and/or the image-processing technologies using the face-detection system become more convenient and effective for users. When at least two subject images are shown in the image frame, it is difficult to determine who should be brought into focus. On the other hand, in the above-described embodiment, when the importance determination is made for a video frame, the result of the priority determination is stabilized in the time direction by referring to the result of the priority determination made in the previous image frame. Thus, since the subject image for focusing and/or the image-quality correction is stabilized in the time direction, the time variation of the camera control performed by the camera-control unit 103 is suppressed so that the camera control can be performed with stability.

Figure 4:
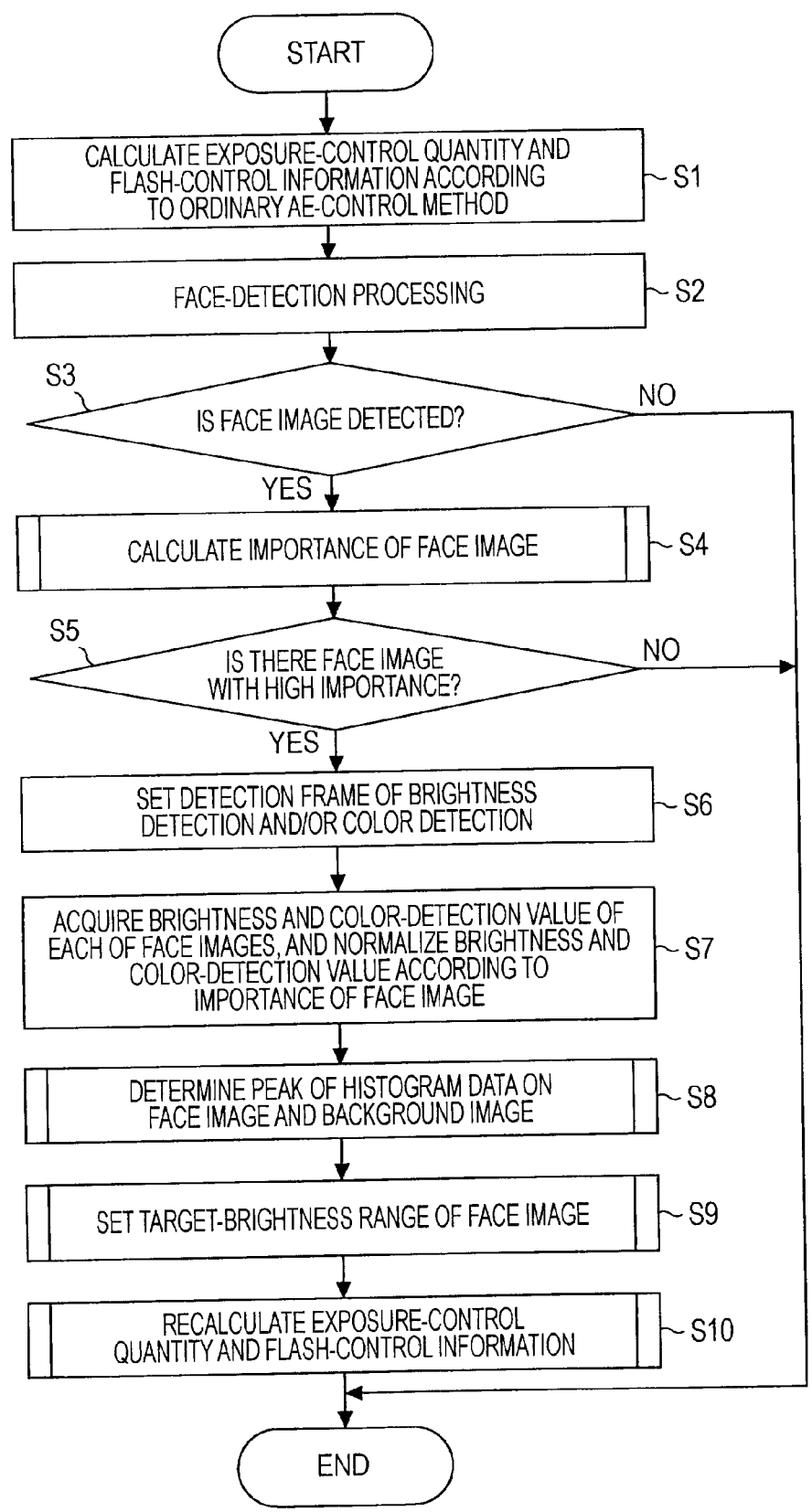
FIG. 4 is a flowchart illustrating processing procedures performed, so as to execute exposure control and flash-light-emission control in a digital-still camera based on the face-detection result.

Next, processing operations performed in the digital-still camera 1, so as to achieve exposure control and/or flash-light-emission control based on the face-detection result, will be described. If at least two subject images are shown in an image frame captured via the image-pickup element 11, the importance and/or the priority of each of the detected face images is obtained, the detected face image with high importance is determined to be the main part, and the exposure control and the flash-light-emission control are performed. FIG. 4 is a flowchart illustrating the above-described processing procedures.

First, the camera-control unit 103 calculates the exposure-control quantity and the flash-control information according to an ordinary AE-control method based on the detection value of an image signal transmitted from the camera-signal-processing unit 17, at step S1.

The above-described "ordinary AE-control method" denotes processing performed to calculate the exposure-control quantity and the flash-control information through processing that has widely been performed without using the face-detection-result data, as shown by the following steps S2, S3, S4, S5, S6, S7, S8, S9, and S10. Basically, the exposure-control quantity and the flash-control information are calculated based on brightness information detected from picked-up-image signals of the entire screen image. Further, the exposure-control quantity is used to control the degree of openness of an iris provided in the optical system 10, the shutter speed obtained by a mechanical shutter and/or an electronic shutter provided in the image-pickup element 11, the quantity of AGC gains of the AFE unit 12, and so forth. The flash-control information is used to control the light-emission operation of the flash-light-emission unit 32.

Next, the face-detection unit 52 detects data on the face of a person from image data output from the camera-signal-processing unit 17, at step S2.

Here, the face-recognition unit 101 determines whether or not the face image is detected by the face-detection unit 52, at step S3. When the face image is detected from an image frame (Yes at step S3), the processing advances to the subsequent step, that is, step S4. If no face image is detected from the image frame (No at step S3), each of the exposure-control quantity and the flash-control information that are calculated, at step S1, is determined to be a definitive value, and the entire processing routine is finished.

Upon receiving the face-detection-result data showing the position, size, etc. of each of detected face images shown in the image frame and the face-recognition-result data showing information about the person agreeing with each of the detected face images, for example, that are transmitted from the face-recognition unit 101, the priority-determination unit 102 calculates importance Wf of each of the detected face images by using at least one of the face-detection-result data and the face-recognition-result data, at step S4. Then, the priority-determination unit 102 determines whether or not a face image with calculated importance Wf of which value is higher than a predetermined value is detected, at step S5.

Then, if the face image with the importance Wf of which value is higher than the predetermined value is detected (Yes at step S5), the processing advances to the subsequent step S6. On the other hand, if the face image with the importance Wf of which value is higher than the predetermined value was not detected (No at step S5), it is determined that any of the detected face images is not important, that is to say, the exposure control and/or the flash-light emission should not be performed for any of the detected face images. Therefore, each of the exposure-control quantity and the flash-control information that are calculated, at step S1, is determined to be the definitive value, and the entire processing routine is finished.

At step S6, the camera-control unit 103 sets a detection frame used for performing brightness detection and color detection for each of the histogram detection and the color detection. Then, the brightness-histogram data and the color-detection value that are corresponding to each of the detected face images are acquired by using the set detection frame. Further, at least two face images of which importance is determined to be high are detected, at step S5, the brightness-histogram data obtained for each of the face images is normalized for the entire face area according to the importance of each of the detected face images, at step S7.

Next, the camera-control unit 103 determines the peak of histogram data obtained for the detected-face image, at step S8. Then, the camera-control unit 103 searches for limit-brightness values Yf_l and Yf_h defining the peak range based on the frequency value and the brightness that are obtained at the peak.

Next, the camera-control unit 103 sets the range of target brightness of the face image based on the importance and color of the face image and external-light information, at step S9.

At step S10, the definitive exposure-control quantity and flash-control information are recalculated based on the face-histogram data (the histogram data normalized, at step S7, when split-detection method is used), the target-brightness range set, at step S9, and the exposure-control quantity and flash-control information that are calculated, at step S1. Then, the camera-control unit 103 transmits an exposure-control signal to the driver 11a and/or the camera-signal-processing unit 17, and transmits a flash-control signal to the flash-light-emission unit 32.

According to the above-described processing procedures, face images are detected from a picked-up image, at step S3. If a face image with importance which is high to some extent is included in the above-described face images, at step S5, exposure control is performed in consideration of the luminosity balance between the face images and the background, at steps S6 to S10. If no face image with the importance which is high to some extent is included in the above-described face images, exposure control is performed in automatic-imaging mode that has widely been used.

Therefore, the exposure control can be performed so that the image of a face, particularly, the image of a face considered as important by a photographer can be picked up with appropriate luminosity and the luminosity balance between the face image and the background image can be maintained appropriately. Then, it becomes possible to automatically perform the above-described exposure control giving consideration to the luminosity balance between the face image and the background image in ordinary automatic-imaging mode only when the face image is detected even though the photographer does not perform setting operations.

Further, refer to Japanese Patent Application No. 2006-20137 for detailed description on the control-value-calculation processing performed according to the ordinary AE-control method, at step S1 shown in the flowchart shown in FIG. 4, the detection processing performed for the brightness-histogram data and the color data, at steps S6 and S7, processing performed to determine the peak of the histogram data, at step S8, processing performed to determine the target-brightness range of the face image, at step S9, the recalculation processing performed for the exposure-control quantity and the flash-control information, at step S10. The right of Japanese Patent Application No. 2006-20137 had already been transferred to the applicant.

Next, the processing performed to determine the importance of data on detected face images, the data being included in image data, and assign priorities to the detected face images, at steps S4 and S5 shown in the flowchart shown in FIG. 4, will be described.

Naturally, the camera-work-automation technologies and/or the image-processing technologies achieved by using the above-described face detection become more convenient and effective for the user as the accuracy of the face detection increases. When at least two subject images are shown in the image data, the importance of each of the subject images should be determined, so as to determine for which of the subject images the AF processing, the AE processing, or the image-quality-correction processing should be performed. By intuition, it can be estimated that the importance of a subject image shown near the center of a picked-up image and/or a large subject image shown in the picked-up image is high so that the subject image is the main part. Therefore, after specifying the subject image shown in the picked-up image by performing the face-detection processing or the like, a priority is given to the subject image based on the distance from the center of the picked-up image to the subject image and/or the size of the subject range. Subsequently, the main-part determination can be made.

Figure 5:
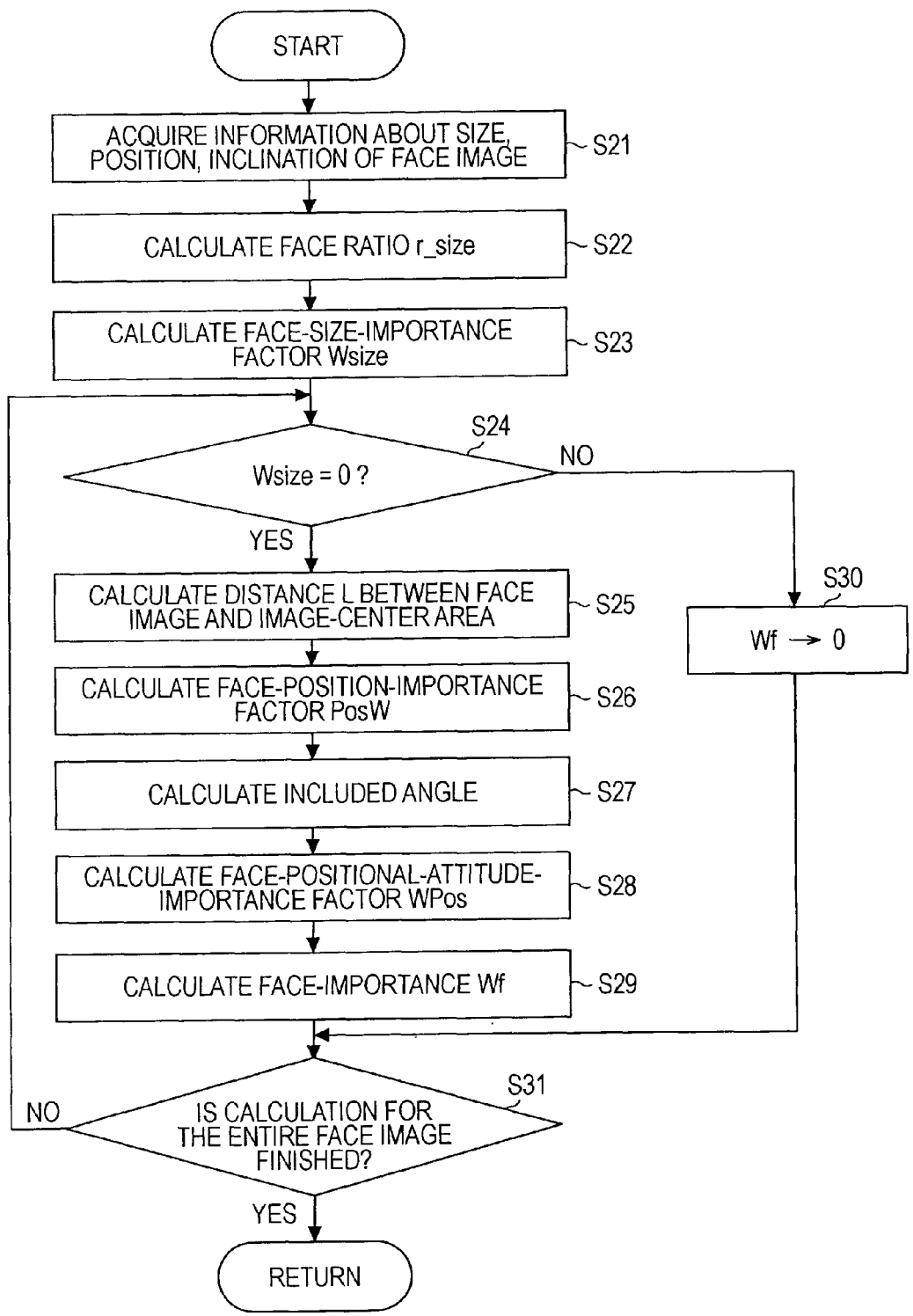
FIG. 5 is a flowchart illustrating example processing procedures performed, so as to determine the importance of a face image based on information about the size and position of the face image, where the information is detected from an image signal.

FIG. 5 shows a flowchart illustrating example processing procedures performed to determine the face importance based on the face-size information and the face-position information that are detected from an image signal. The processing procedures are performed, at step S4 of the flowchart shown in FIG. 4. According to the processing procedures shown in FIG. 5, the face-size information and the face-position information that are detected from the image signal are acquired, the first importance factor is calculated based on the size information, the second importance factor is calculated based on the position information, and the definitive importance is calculated based on the first and second importance factors, whereby importance valued by the photographer is determined.

First, the priority-calculation unit 102 acquires information about the size, position, and inclination of each of detected face images from the face-recognition unit 101, as information about the detected face images, at step S21.

Next, the priority-calculation unit 102 calculates the ratio between the size of each of the detected face images and the size of the entire screen image (the face ratio), and temporarily stores data on the ratio in a RAM (not shown), at step S22.

Next, at step S23, the priority-calculation unit 102 calculates a face-size-importance factor Wsize indicating the importance derived from the ratio between the entire screen image and the face size for each of the detected face images based on the result of the calculation performed, at step S22. The face-size-importance factor Wsize is calculated through the following equalities (1) and (2) according to the magnitude of the face ratio r_size, for example. Further, each of Rfb1 and Rfb2 denotes a threshold value and the inequality Rfb1<Rfb2 holds.

If r_size>Rfb2, then:

$$Wsize=100[\%] \qquad \text{Equality (1)}$$

If Rfb1≦r_size≦Rfb2, then:

$$Wsize=(r\_size-Rfb1)/(Rfb2-Rfb1) \qquad \text{Equality (2)}$$

If r_size<Rfb1, then:

$$Wsize=0 \qquad \text{Equality (3)}$$

Figure 6:
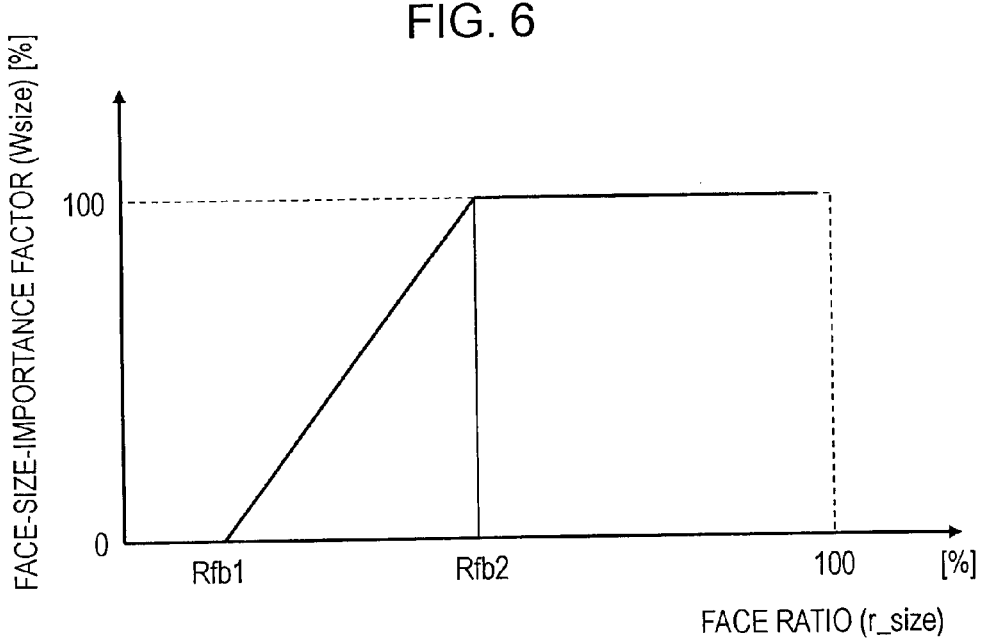
FIG. 6 is a graph illustrating the correspondence between a face ratio and a face-size-importance factor.

FIG. 6 shows a graph illustrating the correspondence between the face ratio r_size and the face-size-importance factor Wsize. According to the above-described Equalities (1) to (3) and FIG. 6, when the value of the face ratio r_size between the screen image and the face image is equivalent to the predetermined threshold value Rfb2 or more, it is determined that the photographer determines to pick up the face image on purpose, and the face-size-importance factor Wsize is set to its maximum value, that is, 100%. On the contrary, if the value of the face ratio r_size is smaller than the predetermined value Rfb1, it is determined that the face is not a subject for imaging, but another face, the background, etc. are subjects for imaging, and the value of the face-size-importance factor Wsize is set to zero. Further, when the value of the face ratio r_size falls within a predetermined range of from Rfb1 to Rfb2, it is difficult to clearly determine whether or not the face is the subject for imaging. In that case, therefore, the value of the size-importance factor Wsize is changed successively according to the ratio. That is to say, as the face ratio r_size increases, the probability that the face is a subject for imaging increases, so that the importance of the face is determined to be high.

Then, the priority-determination unit 102 determines whether or not the value of the face-size-importance factor Wsize is zero, at step S24. If the value of the factor Wsize is not zero (No at step S24), the processing corresponding to the subsequent step S25 is performed. If the value of the factor Wsize is zero (Yes at step S24), the processing corresponding to step S10 is performed.

The distance L between a predetermined image-center area and the face image is calculated, at step S25. Then, a face-position-importance factor PosW indicating importance derived from the position of the face image shown in the screen image is calculated, at step S26. Here, the maximum value PosWh and the minimum value PosWl of the face-position-importance factor are calculated according to the distance L calculated, at step S25.

Next, the priority-calculation unit 102 calculates an included angle ang which an estimation-barycentric-oblique line LineA extending from the face image to the leg image forms with an oblique line LineB extending from the face image to the image center based on information about the position and inclination of the face image, at step S27.

Then, at step S28, the value of a face-positional-attitude-importance factor Wpos is calculated, based on the result of each of the calculations performed, at steps S26 and S27. The face-positional-attitude-importance factor Wpos shows the importance derived from the position and inclination of the face image shown in the screen image. The range of the face-positional-attitude-importance factor Wpos is limited according to the value of the distance L between the image-center area and the face image based on the result of the calculation performed, at step S25.

Then, the priority-calculation unit 102 calculates the definitive importance Wf of the detected face image according to the following equality (4), at step S29.

$$Wf = Wsize \times Wpos \qquad \text{Equality (4)}$$

Through the use of the above-described equality (4), the face importance Wf is determined based on three parameters indicating the size, position, and inclination of the face image produced in the screen image.

Here, the following equality (5) is provided, as a modification of the calculation expression of the face importance Wf. According to the equality (5), the importance Wf is determined based on the size and position of the face image produced in the screen image.

$$Wf = (\text{size coefficient}) \times r\_size$$

$$-(\text{coefficient x}) \times (\text{distance x from screen-image center to detected face image})$$

$$-(\text{coefficient y}) \times (\text{distance y from screen-image center to detected face image}) \qquad \text{Equality (5)}$$

If the value of the size coefficient is high in the above-described equality (5), as the size of a subject image produced in a picked-up image increases, the subject image is more easily determined to be the main-subject image. Further, when the value of each of the coefficients x and y is high, the subject image is more easily determined to be the main-subject image, as the subject image gets nearer the center of the picked-up image in each of horizontal and vertical directions.

Further, when the value of the face importance Wf calculated, at the above-described step S23, is zero (Yes at step S24), the priority-calculation unit 102 sets the value of the definitive face importance Wf to zero, at step S30.

After performing the processing corresponding to step S29 and/or step S30, the priority-calculation unit 102 determines whether or not the calculation of importance Wf is finished for each of face images detected by the face-recognition unit 101, at step S31. If the calculation of importance Wf is not finished (No at step S31), the processing returns to step S23 so that the calculation of importance Wf is performed for other detected face images in the same manner as that described above. If the calculation of importance Wf is finished for each of the face images (Yes at step S31), the entire processing routine is finished.

Here, please refer to Japanese Patent Application No. 2006-20137 for details on the processing procedures performed, at steps S25, S26, S27, and S28, where the right of Japanese Patent Application No. 2006-20137 had already been transferred to the applicant.

The priority-calculation unit 102 calculates the importance Wf for each of the detected-face images by using the above-described equalities (4) and (5), and assigns priorities to the detected-face images in decreasing order of the importance Wf. Therefore, it becomes possible to appropriately determine whether or not the user deliberately selected the detected-face image with the highest priority, as the imaging subject. That is to say, the camera-control unit 103 should perform automatic control for camera works including the AF processing, the AE processing, etc. and/or image-quality-adjustment control including the AWB processing or the like for the detected face image with the highest priority.

When imaging is performed for a subject including a person and/or an animal such as a pet, the position and/or size of each of the subject images shown in a picked-up image is not fixed, but changed every moment. If a single still image is determined to be the processing subject, the importance-determination result is uniquely determined according to a determination algorithm. On the other hand, if the importance of the subject image is determined by using video such as through images, the position and size of each of the subject images are not fixed, but changed every moment in all of image frames that are successively generated on the time base.

According to the importance-determination method using the above-described equalities (4) and (5), for example, the importance is calculated based on a single still image. Therefore, if the size and/or position of a detected-face image differs from image frame to image frame, the importance of the detected-face image, that is, the result of priority-determination made for the detected-face image may vary according to the above-described difference. As a result, the main-subject image frequently changes, which makes the auto-focus operation and/or the image-quality-correction operation unstable in the time direction.

For solving the above-described problems, the applicant et al. propose a method of referring to the result of priority determination made in the previous image frame at the time where the importance determination and/or priority assignment is performed for each of subject images detected from a video frame including a through image through the face-image detection. According to the above-described method, the result of the priority determination is stabilized in the time direction, even though the position and/or size of each of the subject images shown in the image frame changes every moment. As a result, when controlling auto focusing or the like performed for a subject image detected during monitoring, a subject image with high priority, that is, the main-subject image is prevented from being changed with a high frequency, which makes it possible to perform the control with stability.

Further, the applicant et al. propose another method of making the importance determination and/or performing the priority assignment for a subject image shown in video with stability. According to the above-described method, a predetermined calculation expression is used so that the importance of a subject image moving around with speed in the screen image becomes low and the subject image resists being determined to be the main subject image. In that case, the result of the priority determination is also stabilized in the time direction.

The following equality (6) shows an example method of calculating the importance Wf of a face image detected from video.

$$Wf = (\text{size coefficient}) \times r\_size \text{:size of detected-face image shown in screen image})$$

$$-(\text{coefficient x}) \times (\text{distance x from screen-image center to detected-face image})$$

$$-(\text{coefficient y}) \times (\text{distance y from screen-image center to detected-face image})$$

$$-(\text{coefficient v}) \times (\text{average speed with which detected-face image moves in screen image})$$

$$+(\text{preferential constant [previous order]}) \qquad \text{Equality (6)}$$

The first, second, and third terms of the right side of the above-described Equality (6) are the same as those of the importance-calculation expression, that is, Equality (5). The above-described first to third terms are achieved when an important subject image is largely shown near the screen-image center. When the value of the size coefficient is high, a subject image largely shown in a picked-up image is more easily determined to be the main-subject image. Further, when the value of each of the coefficients x and y is high, the subject image is more easily determined to be the main-subject image, as the subject image gets nearer the center of the picked-up image in each of horizontal and vertical directions.

Here, an example of determining the importance of a detected-face image based on video such as through images will be described. If the importance of a detected-face image of which position significantly varies from image frame to image frame is determined to be high, even though a high value is shown until the third term of the right side of Equality (6) according to calculations performed in an image frame generated at a predetermined time and/or image frames, the auto-focus operations and/or image-correction operations become unstable in the time direction. Therefore, in the fourth term of Equality (6), the factor (coefficient v)×(average speed) relating to the average speed of the detected-face image shown in the screen image is subtracted from the importance Wf so that the priority of the detected-face image in large motion is decreased. Further, when the value of the coefficient v is increased, as the speed of the detected-face image decreases, the detected-face image is more easily determined to be the main subject image.

Here, the basic magnitude relations between the coefficients used in the right side of Equality (6) can be expressed, as below, for example.

$$\text{Coefficient v} > \text{size coefficient} > \text{coefficient x} > \text{coefficient y} \qquad \text{Inequality (7)}$$

According to the above-described magnitude relations, first, the priority of the subject image moving with speed in the screen image can be decreased. Further, of subject images stationary over a plurality of image frames, a large-sized subject image close to the center of the image frame in the horizontal direction is put on a high priority. However, the substance of an embodiment of the present invention is not necessarily limited to the magnitude relationships between the coefficients shown in Inequality (7). Namely, the magnitude relationships between the importance coefficients may be dynamically changed according to photographing mode and/or operation mode set to a camera, such as portrait-photographing mode, background-photographing mode, sport-photographing mode, etc., the photographing environment and/or operation environment of a camera, such as night scenery, darkness, and so forth.

Contrary to the above-described case, in the case where a digital-still camera is used, the priority of a subject image in motion can be increased by selecting photographing mode including "sport mode", "video mode", and so forth. Further, in the case where a video camera is used, the priority of the subject image in motion can be increased by setting a minus sign for the coefficient v and/or decreasing the absolute value of the coefficient v.

Further, as the size and/or position of each of the detected-face images varies from image frame to image frame of video including through images or the like, the result of calculations of the importance Wf of the detected face image may be changed, the calculations being shown by the first to third terms of the right side of Equality (6). When simply following the above-described phenomenon, the main-subject image is changed with high frequency so that the auto-focus operation and/or the image-quality-correction operation is performed with less stability in the time direction. Therefore, in the fifth term of the right side of Equality (6), a preferential constant is added to the importance Wf. The above-described preferential constant is a weight constant determined according to the previous priority. As the previous priority of the detected-face image becomes higher, the value of a preferential constant given to the detected-face image is increased so that the priority change occurring at every control cycle decreases. Subsequently, the auto-focus operations and/or the image-quality-correction operations are stabilized in the time direction.

Although each of the size of the detected-face image, the distance between the detected-face image and the screen-image center, etc. is changed by as much as 10% of what it was, it is preferable that the preferential constant is set to a value which does not change the priority of a subject image to which the highest importance Wf was assigned last time.

Figure 7:
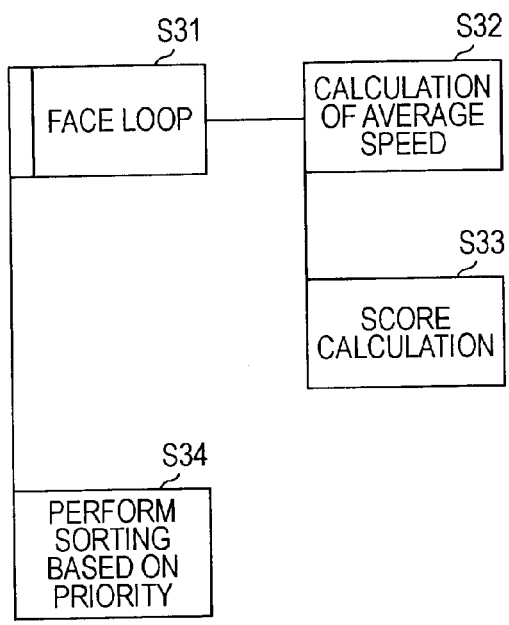
FIG. 7 illustrates the configuration of an algorithm used to calculate the importance of each of detected face images included in video and determine the priority of each of the detected face images.

In the case where the importance Wf is calculated, as shown by Equality (6), the face-importance calculation performed, at step S4 shown in the flowchart of FIG. 4, is replaced with processing procedures shown in FIG. 7. That is to say, in the face loop shown at step S31, the average speed is calculated for each of face images detected from image data by the face-detection unit 52, at step S32, and the importance Wf is calculated considering the calculated average speed and the preference constant determined based on the previous priority, at step S33. Then, the priority of each of the detected-face images is updated based on the calculated importance Wf, at step S34.

In FIG. 7, the algorithm configuration is shown in program-chart notation referred to as the problem-analysis diagram (PAD), which is different from the Japanese Industrial Standards (JIS) flowchart. In essence, an algorithm can be expressed, as the combination of three basic units including concatenation, replication, and selection, and the PAD is achieved through a description method using the above-described three types of basic units. However, the processing performed to determine the priority of a detected face image according to an embodiment of the present invention is not limited to predetermined chart notation.

In Equality (6) used for determining the importance in the above-described manner, information about the size of the detected face image and the position of the detected face image shown in the screen image is used, as geometric information about the detected-face image obtained from image data. When determining the importance of the detected face image, the information about the position of the detected face image shown in the screen image can be interpreted in several ways.

Figure 8:
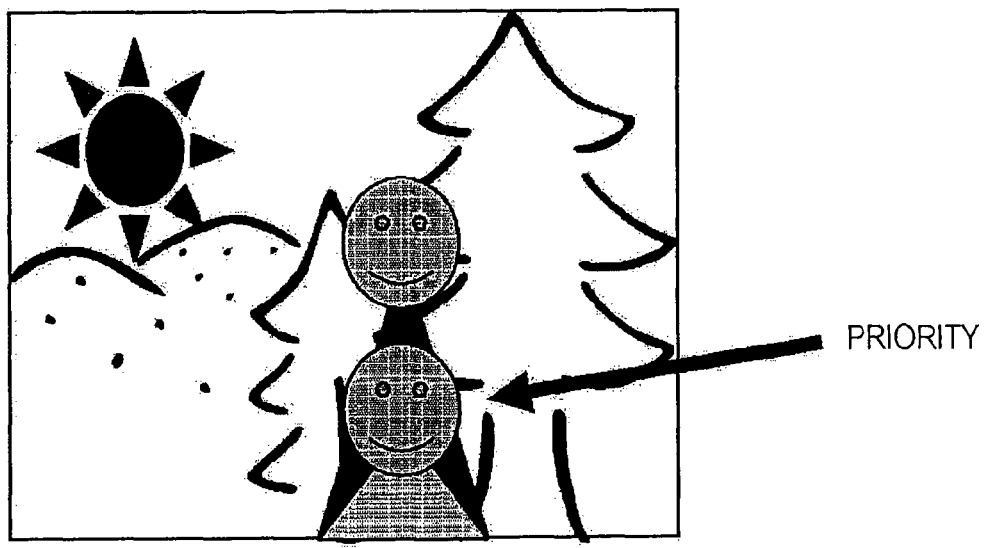
FIG. 8 shows an example picked-up image showing subject images aligned in sequence from the front.

In the above-described Equality (6), the importance is calculated on the basis of the distance from the screen-image center to the detected-face image. However, if subject images are aligned in sequence from the front, as is the case with a group photograph, it is estimated that a subject of which image is shown in the lower part of the screen image is closer to the camera than other subjects are (see FIG. 8) so that a high priority should be given to the subject image shown in the lower part. Therefore, the importance Wf may be calculated based on the distance y from the lower end of the screen image to the detected-face image in place of the distance y from the screen-image center to the detected-face image.

$Wf$=(size coefficient)×($r\_size$:size of detected-face image produced in screen image)

−(coefficient x)×(distance x from screen-image center to detected-face image)

−(coefficient y)×(distance y from lower end of screen image to detected-face image)

−(coefficient v)×(average speed with which detected-face image moves in screen image)

+(preferential constant [previous order])     Equality (8)

Figure 9:
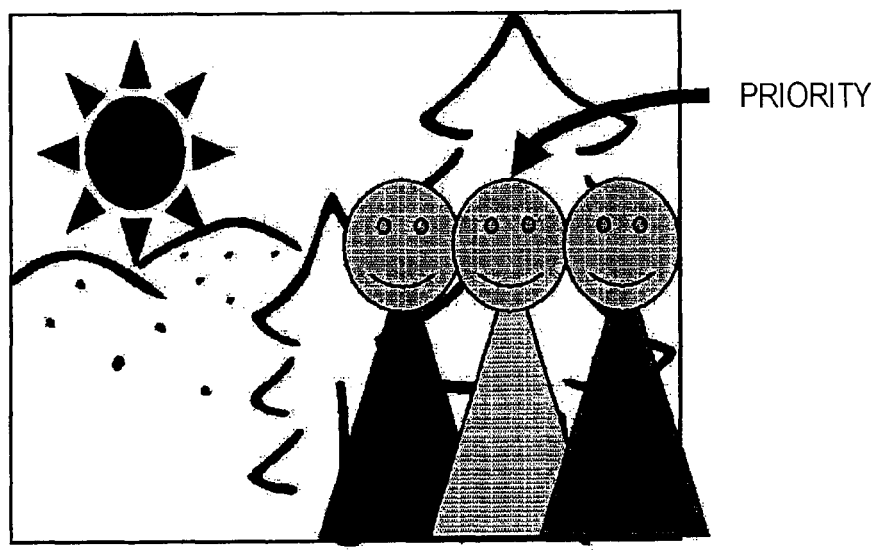
FIG. 9 shows an example image obtained by photographing a plurality of subjects aligned at a distance from the center of a screen image.

The importance is calculated on the basis of the distance from the screen-image center to the detected-face image in the above-described Equality (6). According to an example composition, however, a plurality of subject images may be aligned at a distance from the screen-image center in consideration of the background, for example (see FIG. 9). In that case, the importance Wf may be calculated based on the "distance x from the barycenter of each of subject images to the detected-face image" in place of the "distance x from the screen-image center to the detected-face image", as is the case with Equality (9) shown below.

$Wf$=(size coefficient)×($r\_size$:size of detected-face image produced in screen image)

−(coefficient x)×(distance x from barycenter of each of subject images to detected-face image)

−(coefficient y)×(distance y from screen-image center to detected-face image)

−(coefficient v)×(average speed with which detected-face image moves in screen image)

+(preferential constant [previous order])     Equality (9)

According to each of Equalities (6), (8), and (9) that are used to calculate the importance, as described above, the importance is calculated by using the detected-face-image information output from the face-detection unit 52. However, the importance may also be calculated by using information about the result of face recognition performed by the face-recognition unit 74 provided in the stage subsequent to the face-detection unit 52. Equality (10) shows an example method of calculating the importance Wf of the detected-face image through the further use of the face-recognition-result information.

$Wf$=(size coefficient)×($r\_size$:size of detected-face image produced in screen image)

−(coefficient x)×(distance x from screen-image center to detected-face image)

−(coefficient y)×(distance y from screen-image center to detected-face image)

−(coefficient v)×(average speed with which detected-face image moves in screen image)

+(preferential constant [previous order])

+(recognition constant)     Equality (10)

Equality (10) described above is the same as Equality (6) except that a recognition constant is added to the right side thereof, as the sixth term. Namely, according to the six term, a predetermined constant is added to the value of the detected-face image recognized by the face-recognition unit 74, as a registered face image, so that the importance of the detected-face image increases. As a result, the registered-face image is easily selected, as the main-subject image.

The recognition constant used in Equality (10) described above may be determined so that a uniform value is given to a face image that had already been registered with the learning-data-storage unit 73. Otherwise, the value of the recognition constant may differ from person to person according to an order and/or other rules on which data is registered with the learning-data-storage unit 73, as shown in the following table.

TABLE 1

| PERSON | RECOGNITION CONSTANT |
| --- | --- |
| MR. A | 100 |
| MR. B | 50 |
| MR. C | 30 |
| ... | |

Further, the face-recognition unit 101 may recognize not only a person, but also a pet. In the case where a face for recognition is that of the pet, it is preferable that a recognition constant higher than that of a person is assigned to the pet. This is because there is a high possibility that the pet image is the main subject image when a composition including the pet image is deliberately determined.

Thus, the main-subject image shown in the image frame can be determined according to the priority determined by the priority-calculation unit 102. Then, the camera-control unit 103 can control the camera works including the AF processing, the AE processing, etc. and/or perform the image-quality adjustment including the AWB processing, the sharpness-and-saturation-contrast adjustment, the flash-light control, the red-eye reduction, etc. according to the main-subject image.

Hitherto, the embodiments relating to the system configured to calculate the importance and priority of a subject based mainly on the face-detection result have been described. On the other hand, another embodiment of the present invention, the embodiment using object-tracking technologies, may be provided.

The object-tracking technologies are used to keep track of an object which is the target of a camera by moving the visual-line direction according to the movement of the target object. For example, Japanese Patent Application No. 2005-78376 discloses a technology used to keep track of the target object based on skin-color information, where the right of Japanese Patent Application No. 2005-78376 had already been transferred to the applicant.

Figure 10:
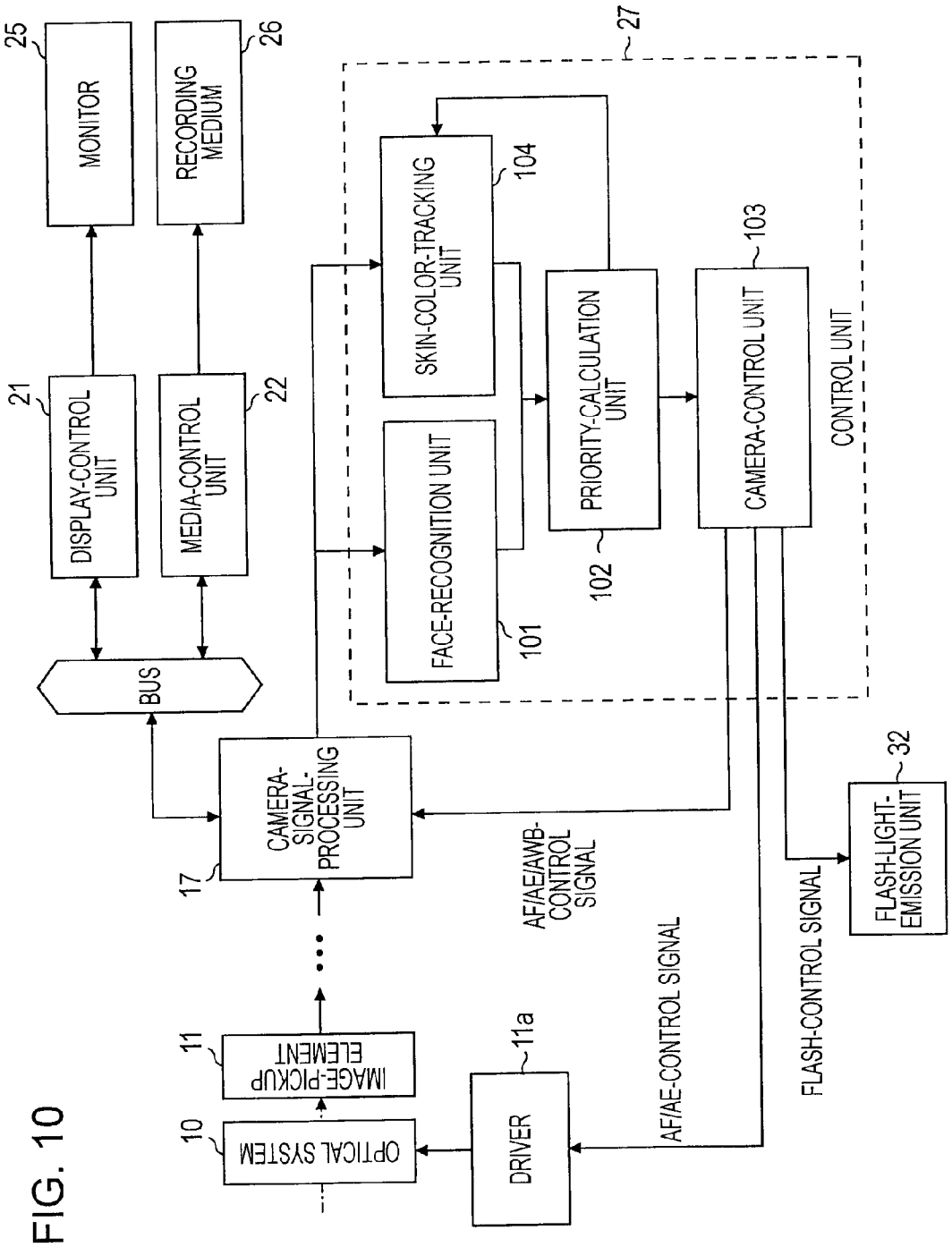
FIG. 10 shows a functional configuration used to perform the camera-signal processing including the AF processing, the AE processing, etc. and the signal-correction processing including the image-quality correction or the like based on the face-recognition result and the result of skin-color tracking.

FIG. 10 shows a functional configuration used to perform the camera-signal processing including the AF processing, the AE processing, etc. and the signal-correction processing including the image-quality correction or the like based on the face-recognition result and the skin-color-tracking result. The priority of each of subjects, the priority being determined by the priority-calculation unit 102, is fed back to a skin-color-tracking unit 104.

Figure 11:
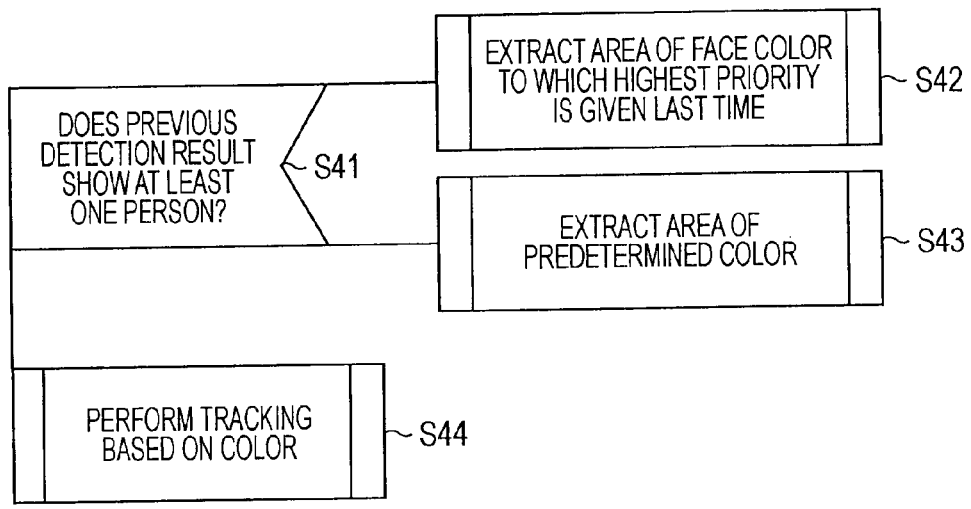
FIG. 11 shows the configuration of an algorithm used to perform the skin-color tracking in the PAD format.

FIG. 11 shows an algorithm configuration used to perform the skin-color tracking in the PAD format.

At step S41, it is determined whether or not at least one detection result was obtained from the previous image frame.

Here, if the face image of a single subject or person was detected from the previous image frame, area-extraction processing is performed, at step S42, based on face-color data to which the highest priority was assigned last time.

On the other hand, if the image of any subject or person was not detected, the area-extraction processing is performed based on a predetermined color such as the typical skin color, at step S43.

Then, tracking processing is performed based on color data by using information about the result of the area-extraction processing, at step S44.

As described above, according to an embodiment of the present invention, it becomes possible to calculate the importance of each of subject images produced in an image frame based on the face-detection result and/or the face-recognition result so that the priority of each of the subject images is obtained. Further, it becomes possible to appropriately perform automatic control for camera works including the AF processing, the AE processing, etc. and/or image-quality adjustment based on the priority of each of the subject images. Further, the method of calculating the importance and priority of a subject image according to an embodiment of the present invention can be effectively used not only when photographing is performed by using a digital camera, but also when a picked-up image is reproduced.

Figure 12:
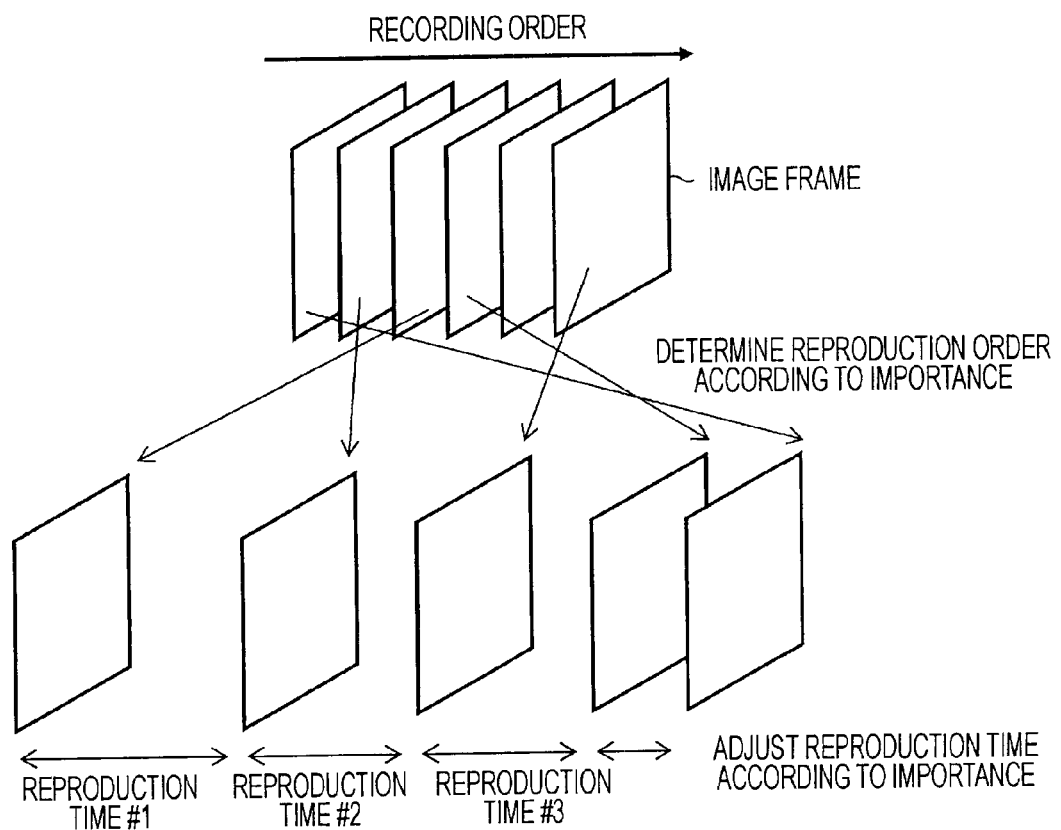
FIG. 12 illustrates how image reproduction is controlled according to the importance of a subject image.

For example, in the case where digital-still cameras developed based on related arts are used to reproduce photographed images, the majority of the digital-still cameras simply read and output data on the photographed images from the recording medium 26 in order of recording so that the photographed images are output displayed on the monitor 25. On the other hand, in the case where a digital camera provided with the technologies of calculating the importance and priority of a subject according to an embodiment of the present invention is used, it becomes possible to obtain numerical data on the importance of each of subject images, a subject image which is the main-subject image, and the importance of the main-subject image for every image frame. Subsequently, it becomes possible to control an order in which image frames are reproduced and a method of reproducing the image frames based on the above-described numerical data (see FIG. 12).

(1) Image frames are divided into groups for each of persons determined to be the main part.

(2) The order of reproducing the image frames is determined in decreasing order of importance of the main subjects.

(3) The order of reproducing the image frames is determined in decreasing order of the total value of importance of each of the subject images, or several top-ranked subject images, where data on the subject images is included in each of the image frames.

(4) The reproduction time is determined for each of the image frames based on the size of the numerical data relating to the importance assigned to each of the subject images. For example, the importance of each of the image frames is determined based on the above-described methods (2) and (3), so that the higher the importance of the image frame becomes, the longer the time of reproducing the image frame becomes.

Further, when switching from a video output transmitted from a camera to another video output, the method of performing screen-image conversion by using special effects such as wiping is widely used. For example, when merging digital images including video, still images, etc. photographed through a digital-still camera and/or a camcorder with each other, the screen-image conversion and/or scene switching can be performed through the special effects such as wiping. In the case where the digital camera provided with the technologies of calculating the importance and priority of a subject image according to an embodiment of the present invention is used, screen-image-transition processing can be performed with efficiency based on the importance of the subject image. For example, it becomes possible to give a slide show generated by focusing on a high-ranked-subject image with high importance. Otherwise, it becomes possible to automatically perform processing, such as increasing the time of reproducing the image of a person with high importance, changing details on the special effects according to the importance.

It should be understood by those skilled in the art that various modifications, combinations, sub-combinations and alterations may occur depending on design requirements and other factors insofar as they are within the scope of the appended claims or the equivalents thereof.

What is claimed is:

1. An image-processing apparatus comprising:
a subject-detection unit configured to detect at least one subject image from inputted image data;
an importance-determination unit configured to determine an importance of the at least one detected subject image; and
a priority-determination unit configured to determine and output a priority of the at least one detected subject image based on the determined importance,
wherein the importance-determination unit is further configured to determine the importance based on a priority previously determined by the priority-determination unit, the previously determined priority being based on an importance previously determined by the importance-determination unit.

2. The image-processing device according to claim 1,
wherein an image-input unit inputs video, as the image data, and
wherein the importance-determination unit determines the importance based further on a speed with which the detected subject image moves in the video.

3. The image-processing device according to claim 1, wherein the importance-determination unit assigns a higher priority to a detected subject image near a center of an image frame.

4. The image-processing device according to claim 2, wherein the importance-determination unit determines the importance in order of the speed with which the detected subject image moves in the video, a size of the detected subject image shown in an image frame, and a position of the detected subject image shown in the image frame.

5. The image-processing device according to claim 1, wherein the importance-determination unit assigns a higher priority to a detected subject image near a lower end of an image frame.

6. The image-processing device according to claim 1, wherein, when a plurality of subject images are produced in an image frame, the importance-determination unit assigns a higher priority to the detected subject image near a barycenter of each of the subject images.

7. The image-processing device according to claim 1, further comprising:
   a face-recognition unit configured to recognize each of at least one detected face image,
   wherein the importance-determination unit assigns a higher priority to the detected face image corresponding to a person recognized by the face-recognition unit.

8. An image-processing method comprising:
   detecting at least one subject image from inputted image data;
   determining an importance of each of the at least one detected subject image; and
   determining and outputting a priority of the at least one detected subject image based on the determined importance,
   wherein, at the importance-determining step, further determining the importance based on a priority previously determined, the previously determined priority being based on an importance previously determined, at the importance-determination step.

9. A non-transitory computer readable storage medium having stored thereon a computer program that includes instructions which when executed on a computer causes the computer to execute a method comprising:
   detecting at least one subject image from inputted image data;
   determining an importance of each of the at least one detected subject image; and
   determining and outputting a priority of the at least one detected subject image based on the determined importance,
   wherein, at the importance-determining step, further determining the importance based on a priority previously determined, the previously determined priority being based on an importance previously determined, at the importance-determination step.

* * * * *